US011082815B2

(12) United States Patent
Park et al.

(10) Patent No.: US 11,082,815 B2
(45) Date of Patent: *Aug. 3, 2021

(54) METHOD OF OPERATING FUNCTION AND RESOURCE OF ELECTRONIC DEVICE

(71) Applicant: Samsung Electronics Co., Ltd., Gyeonggi-do (KR)

(72) Inventors: Ji Hyun Park, Gyeonggi-do (KR); Kwang Sub Son, Gyeonggi-do (KR); Dong Il Son, Gyeonggi-do (KR); Sung Ho Son, Daegu (KR); Su Ha Yoon, Seoul (KR); Sun Kee Lee, Gyeonggi-do (KR); Won Suk Choi, Seoul (KR); Sun Min Hwang, Gyeonggi-do (KR); Sung Hyuk Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/810,142

(22) Filed: Mar. 5, 2020

(65) Prior Publication Data

US 2020/0204963 A1 Jun. 25, 2020

Related U.S. Application Data

(63) Continuation of application No. 16/037,583, filed on Jul. 17, 2018, now Pat. No. 10,623,915, which is a
(Continued)

(30) Foreign Application Priority Data

Feb. 23, 2014 (KR) ........................ 10-2014-0021006

(51) Int. Cl.
*H04W 4/16* (2009.01)
*H04W 4/80* (2018.01)

(52) U.S. Cl.
CPC ............... *H04W 4/16* (2013.01); *H04W 4/80* (2018.02)

(58) Field of Classification Search
CPC . H04W 88/06; H04W 88/18; H04M 1/72577; Y02D 70/23; Y02D 70/144
See application file for complete search history.

(56) References Cited

U.S. PATENT DOCUMENTS 7,606,217 B2  10/2009  Bender et al.
8,379,634 B2   2/2013  Bender et al.
(Continued)

FOREIGN PATENT DOCUMENTS

CN  201830433  5/2011
CN  102541415  7/2012
(Continued)

OTHER PUBLICATIONS

European Search Report dated Oct. 5, 2017 issued in counterpart application No. 15751511.5-1853, 14 pages.
(Continued)

*Primary Examiner* — Kevin Kim
(74) *Attorney, Agent, or Firm* — The Farrell Law Firm, P.C.

(57) ABSTRACT

A portable communication device is provided. A communication connection is established with a first external device. A telephone call function using is deactivated, based at least in part on a determination that the portable communication device is communicatively coupled with the first external device and that a cellular communication circuitry of the first external device is available. While the telephone call function is deactivated, a telephone call is performed with respect to a second external device using the communication connection and a cellular communication between the first external device and the second external device. The cellular
(Continued)

communication is established via the cellular communication circuitry of the first external device.

22 Claims, 21 Drawing Sheets

Related U.S. Application Data continuation of application No. 14/629,022, filed on Feb. 23, 2015, now Pat. No. 10,064,030.

(56) References Cited

U.S. PATENT DOCUMENTS

| | | |
|---|---|---|
| 8,744,453 B2 | 6/2014 | Ge et al. |
| 8,792,479 B2 | 7/2014 | Bender et al. |
| 8,958,745 B2 | 2/2015 | Kim |
| 2005/0002506 A1 | 1/2005 | Bender et al. |
| 2005/0122963 A1 | 6/2005 | Jeon et al. |
| 2007/0032225 A1 | 2/2007 | Konicek |
| 2009/0047991 A1 | 2/2009 | Elg |
| 2009/0323920 A1 | 12/2009 | Bender et al. |
| 2010/0112964 A1 | 5/2010 | Yi et al. |
| 2011/0145397 A1 | 6/2011 | Burns et al. |
| 2011/0179120 A1 | 7/2011 | Fein et al. |
| 2011/0211559 A1 | 9/2011 | Lim et al. |
| 2012/0033658 A1 | 2/2012 | Ganesan |
| 2012/0203916 A1 | 8/2012 | Burns et al. |
| 2012/0302219 A1 | 11/2012 | Vang |
| 2012/0307824 A1 | 12/2012 | Sun |
| 2012/0329390 A1 | 12/2012 | Kim |
| 2013/0051281 A1 | 2/2013 | Lazaridis et al. |
| 2013/0148649 A1 | 6/2013 | Bender et al. |
| 2013/0183950 A1 | 7/2013 | Hwang |
| 2014/0106677 A1* | 4/2014 | Altman ................ H04W 12/06 455/41.2 |
| 2014/0253415 A1 | 9/2014 | Hardy |
| 2014/0378063 A1 | 12/2014 | Nathwani |
| 2015/0163295 A1 | 6/2015 | Shmilov et al. |
| 2015/0172450 A1 | 6/2015 | Singhal |
| 2015/0281914 A1 | 10/2015 | Kamma |
| 2016/0217661 A1 | 7/2016 | de Jong |
| 2019/0044559 A1 | 2/2019 | Altman |
| 2019/0089392 A1 | 3/2019 | Altman |
| 2019/0089393 A1 | 3/2019 | Altman |

FOREIGN PATENT DOCUMENTS

| | | |
|---|---|---|
| CN | 102573128 | 7/2012 |
| CN | 203164616 | 8/2013 |
| CN | 103379304 | 10/2013 |
| EP | 2 525 531 | 11/2012 |
| KR | 10-0674090 | 6/2006 |
| KR | 20110006201 | 1/2011 |
| KR | 20150090424 | 8/2015 |
| WO | WO 2014/010869 | 1/2014 |
| WO | WO 2014/013355 | 1/2014 |

OTHER PUBLICATIONS

European Search Report dated Jan. 9, 2018 issued in counterpart application No. 15751511.5-1213, 13 pages.
International Search Report dated Jun. 29, 2015 issued in counterpart application No. PCT/KR2015/001705, 5 pages.
Chinese Office Action dated Jul. 6, 2018 issued in counterpart application No. 201580009817.8, 15 pages.
Chinese Office Action dated Feb. 25, 2019 issued in counterpart application No. 201580009817.8, 17 pages.
Indian Examination Report dated Sep. 10, 2020 issued in counterpart application No. 201647030896, 6 pages.
Burg, "Quick Starter Guide Burg 16A", Copyright 2014 Burg China Connection, pp. 39.
Chinese Office Action dated Apr. 23, 2021 issued in counterpart application No. 201911162175.1, 15 pages.

* cited by examiner

METHOD OF OPERATING FUNCTION AND RESOURCE OF ELECTRONIC DEVICE

PRIORITY

This application is a Continuation Application of U.S. patent application Ser. No. 16/037,583, filed in the U.S. Patent and Trademark Office (USPTO) on Jul. 17, 2018, which is a Continuation Application of U.S. patent application Ser. No. 14/629,022, filed in the USPTO on Feb. 23, 2015, now U.S. Pat. No. 10,064,030, issued on Aug. 28, 2018, which claims priority under 35 U.S.C. § 119(a) to Korean Patent Application No. 10-2014-0021006 filed in the Korean Intellectual Property Office on Feb. 23, 2014, the contents of each of which are incorporated herein by reference.

BACKGROUND

1. Field of the Invention

The present invention relates generally to a method of effectively using functions and resources of electronic devices based on state information of each electronic device in an environment in which a plurality of electronic devices interoperate with each other.

2. Description of the Related Art

As electronic devices providing various functions, for example, smartphones, are used more widely, the utilization areas may go beyond communication, multimedia, and e-banking and expand into the field of the Internet of Things (IoT), that is, network communications between people and things or things and things. Furthermore, communications between people and things or things and things via a mobile communication network such as Machine to Machine (M2M) or Machine Type Communication (MTC) provide useful information for living. Additionally, like smart homes or smart cars, services controlling homes or vehicles and efficiently processing information based on electronic devices continue to increase.

The increase of such various networks and related services maximizes the fields of services that electronic devices provide, but as the number and types of electronic devices that users use increase, this may result in inefficient resource and power management. For example, when a smartphone and a tablet are used together, provided services, mounted modules, or applications may often overlap. Additionally, there may be a performance difference in mounted components according to electronic devices. Thus, a user might not use a component having the best performance among electronic devices that the user owns.

SUMMARY

The present invention has been made to address the above-mentioned problems and disadvantages, and to provide at least the advantages described below. Accordingly, an aspect of the present invention provides a method of providing efficient resource and power management by collecting each device related information, deactivating a specific function based on the information, and performing the deactivated function through another device between a plurality of electronic devices.

Another aspect of the invention provides a method of efficient resource and power management by collecting information related to each device, determining an electronic device to perform a specific operation based on the information, deactivating a specific function of a corresponding electronic device, and performing the deactivated function via another device between a plurality of electronic devices.

In accordance with an aspect of the present disclosure, a portable communication device is provided that includes a first communication circuitry to perform a short-range communication, a second communication circuitry to perform a cellular communication, and a processor. The processor is configured to establish, via the first communication circuitry, a communication connection with a first external device. The processor is also configured to deactivate a telephone call function using the second communication circuitry, based at least in part on a determination that the portable communication device is communicatively coupled with the first external device via the communication connection and that a cellular communication circuitry of the first external device is available. The processor is further configured to, while the telephone call function using the second communication circuitry is deactivated, perform a telephone call with respect to a second external device using the communication connection and a cellular communication between the first external device and the second external device. The cellular communication is established via the cellular communication circuitry of the first external device.

In accordance with another aspect of the present disclosure, a portable communication device is provided that includes a touchscreen display, a first communication circuitry to perform a short-range communication, a second communication circuitry to perform a cellular communication, and a processor. The processor is configured to establish, via the first communication circuitry, a communication connection with a first external device. The processor is also configured to, based at least in part on a determination that the portable communication device is communicatively coupled with the first external device via the communication connection, transmit a first signal to the first external device via the communication connection such that a telephone call function using cellular communication circuitry of the first external device is to be deactivated based at least in part on the first signal. The processor is further configured to, while the telephone call function using the cellular communication circuitry of the first external device is deactivated, receive, from the first external device via the first communication circuitry, a second signal to make an outgoing call from the first external device to a second external device. The processor is also configured to establish, using the second communication circuitry, a call session with respect to the second external device such that the outgoing call is to be performed based at least in part on the call session.

In accordance with another aspect of the present disclosure, a system for portable communication is provided that includes a portable device and a wearable device. The portable device includes a first communication circuitry to perform short-range communication, a second communication circuitry to perform cellular communication, and a processor configured to establish, via the first communication circuitry, a communication connection with the wearable device. The wearable device includes a third communication circuitry to perform short-range communication, a fourth communication circuitry to perform cellular communication, and a processor. The processor is configured to establish, via the third communication circuitry, the communication connection with the portable device. The processor is also configured to deactivate a telephone call function using the fourth communication circuitry of the wearable device, based at least in part on a determination that the wearable device is communicatively coupled with the portable device via the communication connection. The processor is further configured to, based at least in part on a determination that the communication connection between the wearable device and the portable device is established, perform a telephone call with respect to an external device using the communication connection and a cellular communication between the portable device and the external device. The cellular communication is established via the second communication circuitry of the portable device.

In accordance with another aspect of the present disclosure a portable communication device is provided that includes a first communication circuitry to perform a short-range communication, a second communication circuitry to perform a cellular communication, and a processor. The processor is configured to establish, via the first communication circuitry, a communication connection with a first external device. The processor is also configured to, based on a first determination that the portable communication device is communicatively coupled with the first external device via the established communication connection, perform a telephone call with respect to a second external device using the established communication connection and a cellular communication between the first external device and the second external device. The cellular communication is established via the cellular communication circuitry of the first external device. The processor is further configured to, based on a second determination that the portable communication device is not communicatively coupled with the first external device via the established communication connection, perform the telephone call with respect to the second external device using a cellular communication between the portable communication device and the second external device. The cellular communication is established via the second communication circuitry of the portable communication device.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION

Figure 1:
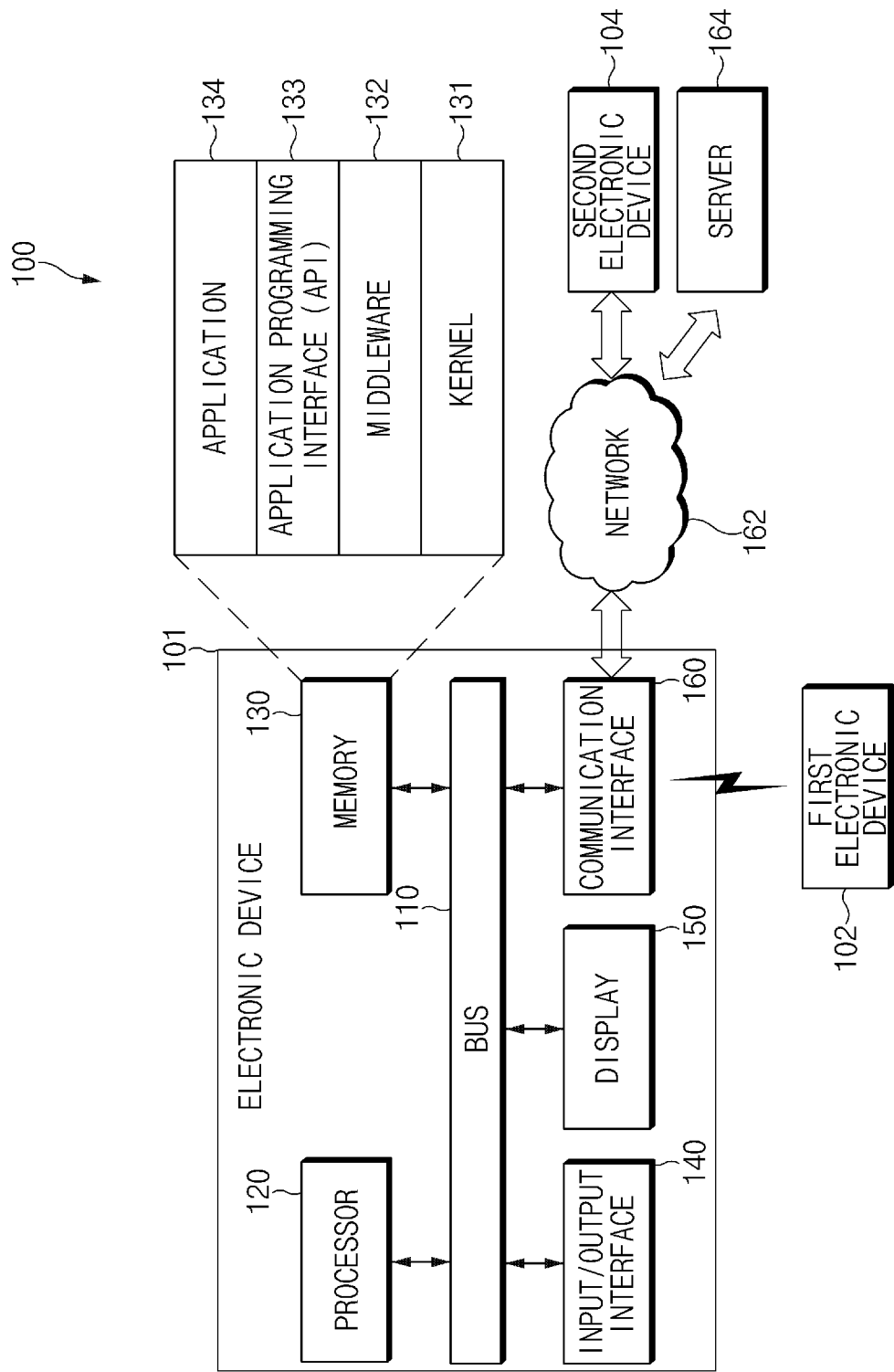
FIG. 1 is a block diagram illustrating an electronic device according to an embodiment of the present invention.

Hereinafter, various embodiments of the present invention are disclosed with reference to the accompanying drawings. Various modifications are possible in various embodiments of the present invention, where embodiments are illustrated in drawings, and related detailed descriptions are provided below. Thus, it is intended that the present invention covers modifications and variations of the present invention that are within the scope of the present invention, as defined in the appended claims and their equivalents. With respect to the descriptions of the drawings, like reference numerals refer to like elements.

The terms "include," "comprise," and "have", or "may include," or "may comprise" and "may have" used herein indicate disclosed functions, operations, or existence of elements but do not exclude other functions, operations or elements. The meaning of "include," "comprise," "including," or "comprising," specifies a property, a region, a fixed number, a step, a process, an element and/or a component but does not exclude other properties, regions, fixed numbers, steps, processes, elements and/or components.

The meaning of the term "or" used herein includes any or all combinations of the words connected by the term "or". For instance, the expression "A or B" includes A, B, or both A and B.

The terms such as "1st", "2nd", "first", "second", and the like used herein refers to modifying various different elements of various embodiments of the present invention, but do not limit the elements. For instance, such terms do not limit the order and/or priority of the elements. Furthermore, such terms are used to distinguish one element from another element. For instance, both "a first user device" and "a second user device" indicate a user device but indicate different user devices from each other. For example, a first component may be referred to as a second component and vice versa without departing from the scope and spirit of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Terms used in this specification are used to describe various embodiments of the present invention, but are not intended to limit the scope of the present invention. The terms of a singular form include plural forms unless they have a clearly different meaning in the context.

Unless otherwise indicated herein, all the terms used herein, which include technical or scientific terms, have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

Additionally, an electronic device according to an embodiment of the present invention is a device with a communication function. For instance, electronic devices may include at least one of smartphones, tablet Personal Computers (PCs), mobile phones, video phones, electronic book (e-book) readers, desktop PCs, laptop PCs, netbook computers, Personal Digital Assistants (PDAs), Portable Multimedia Player (PMPs), Moving Picture Experts Group Audio Layer 3 (MP3) players, mobile medical devices, cameras, and wearable devices (e.g., Head-Mounted-Devices (HMDs) such as electronic glasses, electronic apparel, electronic bracelets, electronic necklaces, electronic accessories, electronic tattoos, and smart watches).

An electronic device according to an embodiment of the present invention may be one of the above-mentioned various devices or a combination thereof. Furthermore, it is apparent to those skilled in the art that an electronic device according to an embodiment of the present invention is not limited to the above-mentioned devices. Hereinafter, an electronic device according to various embodiments of the present invention is described in more detail with reference to the accompanying drawings. The term "user" in various embodiments may refer to a person using an electronic device or a device using an electronic device (for example, an artificial intelligent electronic device).

Hereinafter, an active state may refer to a state in which an electronic device, a component of an electronic device, or a function performed by an electronic device operates. For example, when an electronic device is active, this may indicate that electrical power to the electronic device is in an ON state according to an embodiment of the present invention. However, according to another embodiment of the present invention, when an electronic device is active, this may indicate that a locked state of the electronic device is released. For example, when a process or a module (for example, a communication module, a module, and so forth) is in an active state, this may refer to a state in which electrical power of a processor or a module is supplied, an enable state in which a processor or a module performs a task, or an awake state in which a processor or a module stands by to perform a task.

In this specification, an inactive state may refer to a state in which an electronic device, a component of an electronic device, or a function performed by an electronic device is not in the active state. For example, when an electronic device is deactivated, this may indicate that electrical power to the electronic device is in an OFF state or the electronic device is in a locked state (that is, a state in which a function cannot be performed). For example, when a processor or a module is in an inactive state, this may indicate a state in which an electrical power supply of the processor or the module is disconnected or is in a sleep state in which the processor or the module ceases to function until a control signal (for example, a wake up signal) is supplied.

FIG. 1 is a block diagram illustrating an electronic device according to an embodiment of the present invention.

Referring to FIG. 1, the electronic device 101 includes a bus 110, a processor 120, a memory 130, an input/output interface 140, a display 150, and a communication interface 160.

The bus 110 is a circuit connecting the above-mentioned components to each other and delivering a communication signal (for example, a control message) therebetween.

The processor 120, for example, receives an instruction from the above other components (for example, the memory 130, the input/output interface 140, the display 150, or the communication interface 160) via the bus 110, interprets the received instruction, and performs operations and data processing in response to the interpreted instruction.

The memory 130 stores an instruction or data received from the processor 120 or other components (for example, the input/output interface 140, the display 150, or the communication interface 160) or an instruction or data generated from the processor 120 or other components. The memory 130, for example, includes programming modules, for example, a kernel 131, middleware 132, an Application Programming Interface (API) 133, and an application 134. Each of the above-mentioned programming modules may be configured with software, firmware, hardware, or a combination thereof.

The kernel 131 controls or manages system resources (for example, the bus 110, the processor 120, or the memory 130) used for performing operations or functions implemented by the remaining other programming modules, for example, the middleware 132, the API 133, or the application 134. Additionally, the kernel 131 provides an interface for accessing an individual component of the electronic device 101 from the middleware 132, the API 133, or the application 134 and controlling or managing the individual component.

The middleware 132 serves as an intermediary for exchanging data between the API 133 or the application 134 and the kernel 131 via communication. Additionally, in relation to job requests received from the plurality of applications 134, for example, the middleware 132 may perform load balancing for the job requests via a method of assigning a priority for using a system resource (for example, the bus 110, the processor 120, or the memory 130) of the electronic device 101 to at least one application among the plurality of applications 120.

The API 133, as an interface through which the application 134 controls a function provided from the kernel 131 or the middleware 132, may include at least one interface or function for file control, window control, image processing, or character control.

The application 134 may include an Short Message Service/Multimedia Messaging Service (SMS/MMS) application, an e-mail application, a calendar application, an alarm application, a health care application (for example, an application for measuring an exercise amount or blood sugar level), or an environmental information application (for example, an application for providing pressure, moisture, or temperature information). Additionally, when there is an external electronic device (for example, a first external electronic device 102 or a second external electronic device 104) communicating with the electronic device 101, for example, the application 134 may include an application relating to information exchange between the electronic device 101 and an external electronic device. For example, the application 134 may include a notification relay application for delivering information to an external electronic device or a device management application for managing an external electronic device. The notification relay application may include a function for delivering notification information occurring in the electronic device 101 to an external electronic device. For example, the notification relay application may have a function for delivering to an external electronic device the notification information occurring from another application (for example, an SMS/MMS application, an e-mail application, a health care application, or an environmental information application). Additionally, the notification relay application may receive notification information from an external electronic device. When there is an external electronic device communicating with the electronic device 101, the device management application manages the external electronic device or services that the external electronic device provides.

The input/output interface 140 delivers a command or data from a user to the processor 120 or the memory 130 via the bus 110. The display 150 displays video, an image or data to a user.

The communication interface 160 establishes communication between the electronic device 101 and the first external electronic device 102, the second external electronic device 104, or the server 164. The communication interface 160 supports a predetermined short-range communication protocol (for example, Wireless Fidelity (Wi-Fi), Bluetooth (BT), Near Field Communication (NFC), and so forth), a predetermined network communication (for example, the Internet, a Local Area Network (LAN), a Wide Area Network (WAN), a telecommunication network, a cellular network, a satellite network, or a Plain Old Telephone Service (POTS), and so forth), a wired communication protocol (for example, Universal Serial Bus (USB), High Definition Multimedia Interface (HDMI), and so forth). For example, the communication protocol (for example, a short-range communication protocol, a network communication protocol, and a wired communication protocol) may be supported by at least one of the API 133 or the middleware 132. Each of the first external electronic devices 102 and the second external electronic device 104 may be identical (for example, the same type) to or different (for example, another type) from the electronic device 101.

Figure 2:
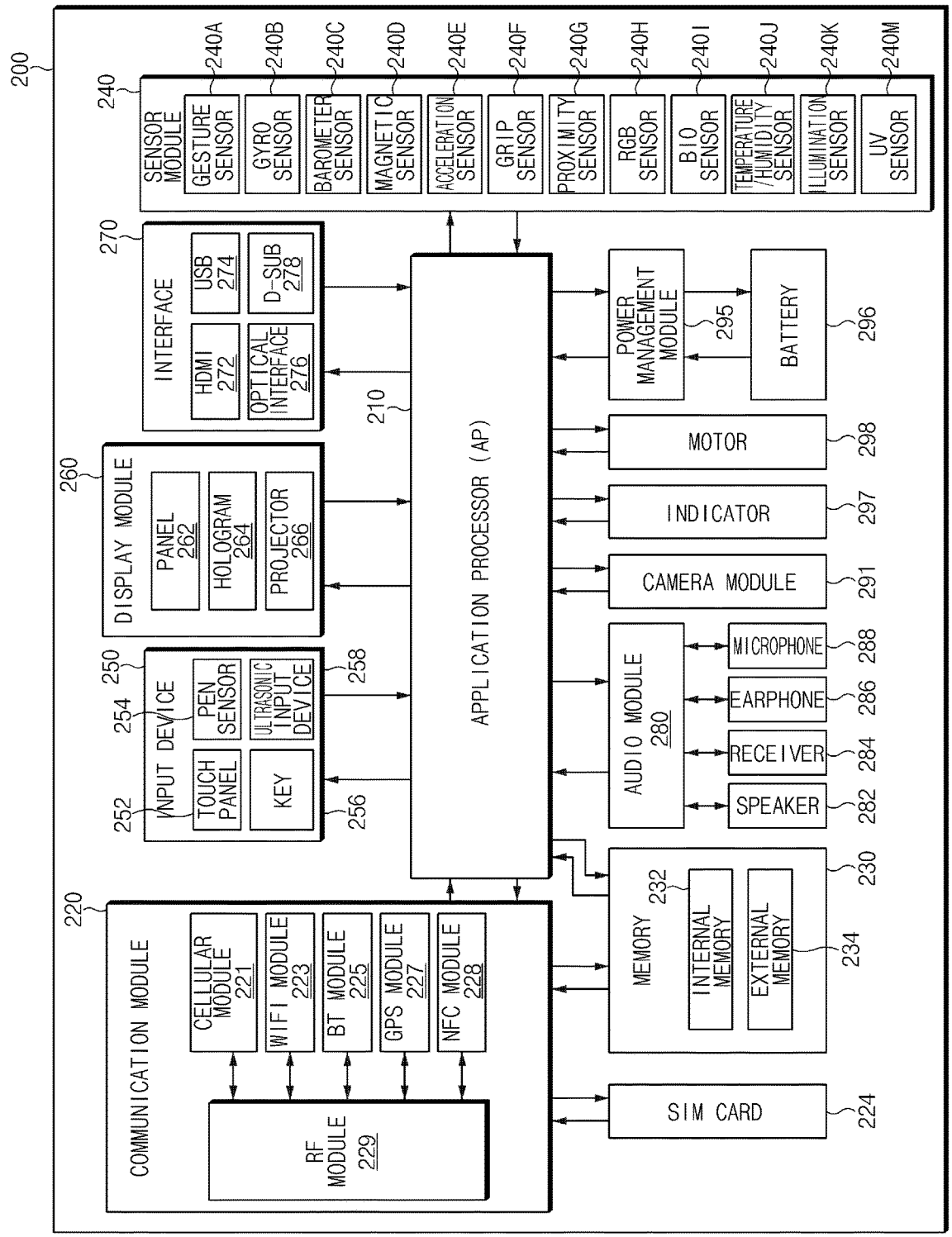
FIG. 2 is a block diagram illustrating hardware according to an embodiment of the present invention.

FIG. 2 is a block diagram illustrating hardware 200 according to an embodiment of the present invention.

The hardware 200, for example, may configure all or part of the above-mentioned electronic device 101 shown in FIG. 1. Referring to FIG. 2, the hardware 200 includes at least one Application Processor (AP) 210, a communication module 220, a Subscriber Identification Module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may control a plurality of hardware or software components connected to the AP 210 and also may perform various data processing and operations with multimedia data by executing an operating system or an application program. The AP 210 may be implemented with a System on Chip (SoC), for example. According to an embodiment of the present disclosure, the AP 210 may further include a Graphic Processing Unit (GPU).

The communication module 220 (for example, the communication interface 160) may perform data transmission through a communication between other electronic devices (for example, the electronic device 104 or the server 106) connected to the electronic device 200 (for example, the electronic devices 100) via a network. According to an embodiment of the present disclosure, the communication module 220 may include a cellular module 221, a Wi-Fi module 223, a BT module 225, a GPS module 227, an NFC module 228, and a Radio Frequency (RF) module 229.

The cellular module 221 may provide voice calls, video calls, text services, or internet services through a communication network (for example, Long Term Evolution (LTE), LTE Advanced (LTE-A), Code Division Multiple Access (CDMA), Wideband CDMA (WCDMA), Universal Mobile Telephone System (UMTS), Wireless Broadband (WiBro), or Global System for Mobile communication (GSM)). The cellular module 221 may perform an authentication operation on an electronic device in a communication network by using a SIM (for example, the SIM card 224), for example. According to an embodiment of the present disclosure, the cellular module 221 may perform at least part of a function that the AP 210 provides. For example, the cellular module 221 may perform at least part of a multimedia control function.

According to an embodiment of the present disclosure, the cellular module 221 may further include a Communication Processor (CP). Additionally, the cellular module 221 may be implemented with SoC, for example. As shown in FIG. 2, components such as the cellular module 221 (for example, a CP), the memory 230, or the power management module 295 are separated from the AP 210, but according to an embodiment of the present disclosure, the AP 210 may be implemented including some of the above-mentioned components (for example, the cellular module 221).

According to an embodiment of the present disclosure, the AP 210 or the cellular module 221 (for example, a CP) may load instructions or data, which are received from a nonvolatile memory or at least one of other components connected thereto, into a volatile memory and then may process the instructions or data. Furthermore, the AP 210 or the cellular module 221 may store data received from or generated by at least one of other components in a nonvolatile memory.

Each of the Wi-Fi module 223, the BT module 225, the GPS module 227, and the NFC module 228 may include a processor for processing data transmitted/received through a corresponding module. Although the cellular module 221, the Wi-Fi module 223, the BT module 225, the GPS module 227, and the NFC module 228 are shown as separate blocks in FIG. 2, according to an embodiment of the present disclosure, some (for example, at least two) of the cellular module 221, the Wi-Fi module 223, the BT module 225, the GPS module 227, and the NFC module 228 may be included in one Integrated Circuit (IC) or an IC package. For example, at least some (for example, a CP corresponding to the cellular module 221 and a Wi-Fi processor corresponding to the Wi-Fi module 223) of the cellular module 225, the Wi-Fi module 227, the BT module 228, the GPS module 221, and the NFC module 223 may be implemented with a single SoC.

The RF module 229 may be responsible for data transmission, for example, the transmission of an RF signal. Although not shown in the drawings, the RF module 229 may include a transceiver, a Power Amplifier Module (PAM), a frequency filter, or a Low Noise Amplifier (LNA). Additionally, the RF module 229 may further include components for transmitting/receiving electromagnetic waves in a free space as a wireless communication, for example, conductors or conducting wires. Although the cellular module 221, the Wi-Fi module 223, the BT module 225, the GPS module 227, and the NFC module 228 share one RF module 229 shown in FIG. 2, according to an embodiment of the present disclosure, at least one of the cellular module 221, the Wi-Fi module 223, the BT module 225, the GPS module 227, and the NFC module 228 may perform the transmission of an RF signal through an additional RF module.

The SIM card 224 is a card implementing a Subscriber Identification Module that is inserted into a slot formed at a position in an electronic device, or embedded in an integrated circuit or chip in an electronic device. Alternatively, without a physical form, SIM information may be stored in a part of an electronic device (for example, electronic SIM, virtual SIM, or soft SIM). The SIM card 224 includes unique identification information (for example, an Integrated Circuit Card Identifier (ICCID)) or subscriber information (for example, an International Mobile Subscriber Identity (IMSI)). The SIM card 224 may operate in relation to the communication module 220.

The memory 230 may include an internal memory 232 or an external memory 234. The memory 230 may be the memory 130 shown in FIG. 1. The internal memory 232 includes at least one of a volatile memory (for example, Dynamic RAM (DRAM), Static RAM (SRAM), Synchronous Dynamic RAM (SDRAM)) and a non-volatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory). According to an embodiment of the present invention, the internal memory 232 may be a Solid State Drive (SSD). The external memory 234 may further include a flash drive, for example, a Compact Flash (CF) drive, a Secure Digital (SD) drive, a Micro Secure Digital (Micro-SD) drive, a Mini Secure Digital (Mini-SD) drive, an extreme Digital (xD) drive, or a memory stick.

The sensor module 240 includes at least one of a gesture sensor 240A, a gyro sensor 240B, a barometer sensor 240C, a magnetic sensor 240D, an acceleration sensor 240E, a grip sensor 240F, a proximity sensor 240G, a Red, Green, Blue (RGB) sensor 240H, a biological, or bio, sensor 240I, a temperature/humidity sensor 240J, an illumination sensor 240K, and an ultra violet light (UV) sensor 240M. The sensor module 240 measures physical quantities or detects an operating state of an electronic device, thereby converting the measured or detected information into electrical signals. Additionally/alternately, the sensor module 240 may include an Electronic nose (E-nose) sensor, an ElectroMyoGraphy (EMG) sensor, an ElectroEncephaloGram (EEG) sensor, an ElectroCardioGram (ECG) sensor, a PhotoPlethysmoGraphy (PPG) sensor, a Heart Rate Monitor (HRM) sensor, a perspiration sensor, or a fingerprint sensor. The sensor module 240 further includes a control circuit for controlling at least one sensor therein.

The input device 250 includes a touch panel 252, a (digital) pen sensor 254, a key 256, or an ultrasonic input device 258. The input device 250 may be the input/output interface 140 shown in FIG. 1. In FIG. 2, the touch panel 252 recognizes a touch input via at least one of a capacitive, a resistive, an infrared, or an ultrasonic method, for example. Additionally, the touch panel 252 may further include a controller. In the case of the capacitive method, both direct touch and proximity recognition are possible. The touch panel 252 may further include a tactile layer. In this case, the touch panel 252 provides a tactile response to a user.

The (digital) pen sensor 254 may be implemented via a method similar or identical to that of receiving a user's touch input or an additional sheet for recognition. The key 256 includes a keypad or a touch key, for example. The ultrasonic input device 258, as a device for checking data by detecting sound waves via a microphone or mic (for example, the microphone 288) in a terminal, provides wireless recognition. According to an embodiment of the present invention, the hardware 200 receives a user input from an external device (for example, a computer or a server) connected to the hardware 200 via the communication module 220.

The display 260 (for example, the display 150) may include a panel 262, a hologram device 264, or a projector 266. The panel 262, for example, may include a Liquid-Crystal Display (LCD) or an Active-Matrix Organic Light-Emitting Diode (AM-OLED). The panel 262 may be implemented to be flexible, transparent, or wearable, for example. The panel 262 and the touch panel 252 may be configured with one module. The hologram 264 may show three-dimensional images in the air by using the interference of light. The projector 266 may display an image by projecting light on a screen. The screen, for example, may be placed inside or outside the electronic device 200. According to an embodiment of the present disclosure, the display 260 may further include a control circuit for controlling the panel 262, the hologram device 264, or the projector 266.

The interface 270 includes a High-Definition Multimedia Interface (HDMI) 272, a Universal Serial Bus (USB) 274, an optical interface 276, or a D-subminiature (D-sub) connector 278, for example. Additionally/alternately, the interface 270 may include a Secure Digital (SD) card/Multi-Media Card (MMC) or an Infrared Data Association (IrDA).

The audio module 280 converts sound and electrical signals in both directions. The audio module 280 converts sound information inputted/outputted via a speaker 282, a receiver 284, an earphone 286, or a microphone 288.

The camera module 291, as a device for capturing images and videos, includes at least one image sensor (for example, a front lens or a rear lens), an Image Signal Processor (ISP), or a flash Light Emitting Diode (LED).

The power management module 295 manages the electrical power consumption of the hardware 200. The power management module 295 includes a Power Management Integrated Circuit (PMIC), a charger Integrated Circuit (IC), a battery gauge, for example.

The PMIC may be built into an IC or an SoC semiconductor, for example. A charging method is classified as a wired method or a wireless method. The charger IC charges a battery and prevents overvoltage or overcurrent flow from a charger. According to an embodiment of the present invention, the charger IC includes a charger IC for at least one of a wired charging method or a wireless charging method. For the wireless charging method, for example, there is a magnetic resonance method, a magnetic induction method, or an electromagnetic method. An additional circuit for wireless charging, for example, a circuit such as a coil loop, a resonance circuit, or a rectifier circuit, may be added.

The battery gauge measures the amount of electrical power in the battery 296, or a voltage, current, or temperature of the battery 296 during charging. The battery 296 may generate electricity and supply electrical power, where the battery 296 may be a rechargeable battery, for example.

The indicator 297 displays a state of the hardware 200 or part thereof (for example, the AP 210), for example, a booting state, a message state, or a charging state. For example, the indicator 297 may display a booting state, a message state, or a charging state. The motor 298 converts electrical signals into mechanical vibration. The hardware 200 may include a processing device (for example, a GPU) for mobile TV support. A processing device for mobile TV support processes media data according to a standard such as Digital Multimedia Broadcasting (DMB), Digital Video Broadcasting (DVB), or media flow.

Each of the above-mentioned components of hardware according to an embodiment of the present invention may be configured with at least one component, and the name of a corresponding component may vary according to the kind of electronic device. Hardware according to an embodiment of the present invention may be configured to include at least one of the above-mentioned components or other components. Additionally, some components of hardware according to an embodiment of the present invention may be combined and configured as one entity, so that functions of previous corresponding components are performed identically.

Figure 3:
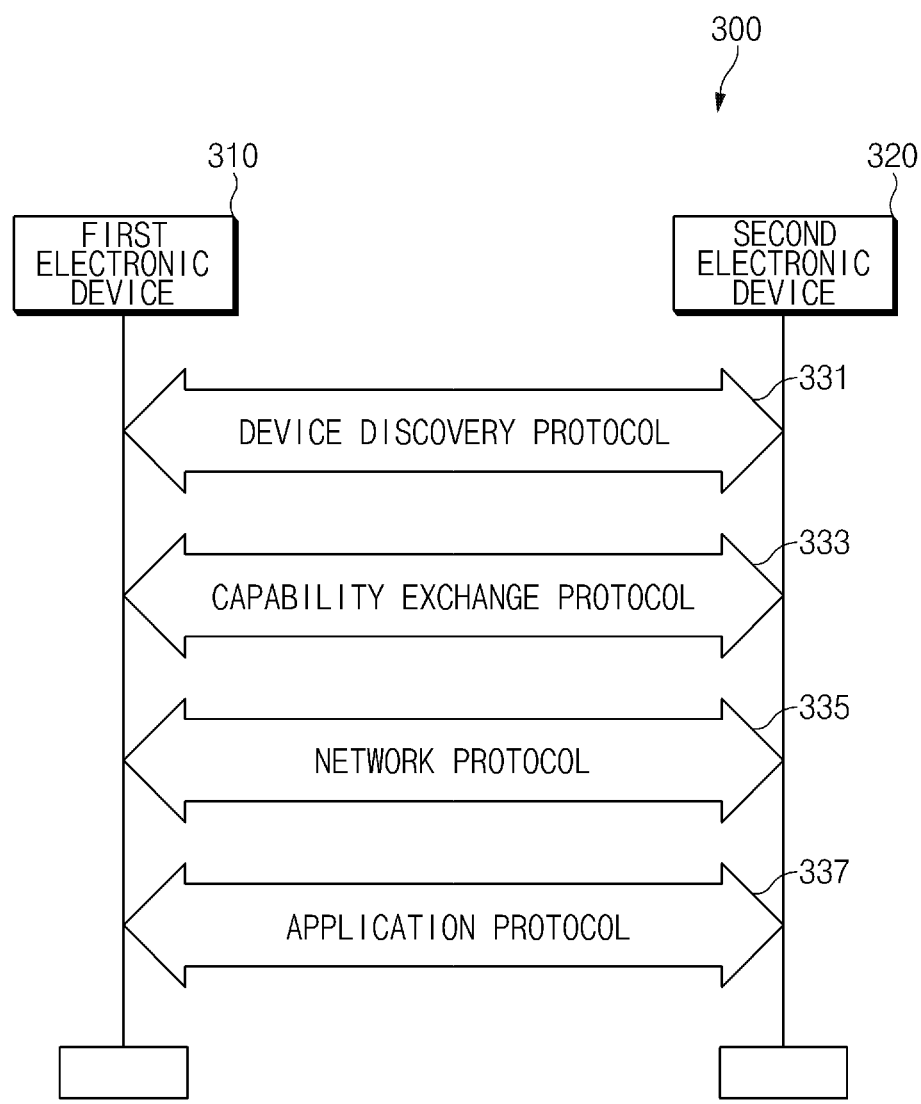
FIG. 3 illustrates communication protocols between a plurality of electronic devices according to an embodiment of the present invention.

FIG. 3 illustrates communication protocols between a plurality of electronic devices according to an embodiment of the present invention.

According to an embodiment of the present invention, the communication protocols 300 include a device discovery protocol 331, a capability exchange protocol 333, a network protocol 335, and an application protocol 337.

According to an embodiment of the present invention, the device discovery protocol 331 is a protocol for detecting a communicable external electronic device or connecting to an external electronic device.

Referring to FIG. 3, for example, a first electronic device 310 detects a communicable second electronic device 320 via an available communication method (for example, Wi-Fi, BT, USB, and so forth) by using the device discovery protocol 331. By using the device discovery protocol 331, the first electronic device 310 identifies the detected second electronic device 320 and then stores identification information of the second electronic device 320. By using the device discovery protocol 331, the first electronic device 310 is connected to the detected second electronic device 320. According to an embodiment of the present invention, the device discovery protocol 331 is a protocol for mutual authentication between a plurality of electronic devices. For example, the electronic device 310 performs an authentication between the first electronic device 310 and the second electronic device 320 by using communication information for connecting to the identified second electronic device 320.

The capability exchange protocol 333 is a protocol for exchanging functions of a supportable service. For example, information relating to functions of services supported by the first electronic device 310 and the second electronic device 320 are exchanged via the capability exchange protocol 333. For example, the information related to a function of a service includes information for distinguishing the service. For example, when receiving information for distinguishing the service from the second electronic device 320, the first electronic device 310 determines whether to support the service by using the received information.

The network protocol 335 is a protocol for controlling a data flow for service connection between connected electronic devices. For example, the network protocol 335 is a protocol for controlling the flow of data for providing a data service between the first electronic device 310 and the second electronic device 320. For example, by using the network protocol 335, error control and data quality control is performed. Additionally, by using the network protocol 335, the first electronic device 310 manages at least one session for data exchange.

The application protocol 337 is a protocol for providing a service to an external electronic device. For example, a service is provided from the first electronic device 310 to the second electronic device 320 via the application protocol 337. For example, the application protocol 337 includes a procedure or information for exchanging data relating to a service between the first electronic device 310 providing the service and the second electronic device 320 using the service.

According to an embodiment of the present invention, the communication protocols 300 includes a standard communication protocol, a communication protocol (for example, a communication protocol for each entity) selected by an individual or organization, or a combination thereof.

The term "module" used in the present disclosure, for example, may refer to a unit including a combination of at least one of hardware, software, and firmware. The term "module" and the terms "unit", "logic", "logical block", "component", or "circuit" may be used interchangeably. "Module" may be a minimum unit or part of an integrally configured component. "Module" may be a minimum unit performing at least one function or part thereof "Module" may be implemented mechanically or electronically. For example, "module" used in the present disclosure may include at least one of an Application-Specific Integrated Circuit (ASIC) performing certain operations, a Field-Programmable Gate Arrays (FPGA), or a programmable-logic device, which are presently known or may be developed in the future.

According to an embodiment of the present invention, at least part of a device (for example, modules or functions thereof) or a method (for example, operations) according to the present disclosure, for example, as in a form of a programming module, may be implemented using an instruction stored in a non-transitory computer-readable storage medium. When at least one processor (for example, the application processor 210) executes an instruction, it performs a function corresponding to the instruction. The non-transitory computer-readable storage medium may include the memory 230, for example. At least part of a programming module may be implemented (for example, executed) by the application processor 210, for example. At least part of a programming module may include a module, a program, a routine, sets of instructions, or a process to perform at least one function, for example.

A programming module according to an embodiment of the present invention includes at least one of the above-mentioned components or additional other components. Alternatively, some programming modules may be omitted. Operations performed by a programming module or other components according to an embodiment of the present invention may be executed via a sequential, parallel, repetitive or heuristic method. Additionally, some operations may be executed in a different order or may be omitted. Or, other operations may be added.

The non-transitory computer-readable storage medium may include a magnetic medium such as a hard disk, a floppy disk, and a magnetic tape, an optical medium such as a Compact Disc Read Only Memory (CD-ROM) and a Digital Versatile Disc (DVD), a magneto-optical medium such as a floptical disk, and a hardware device configured to store and perform a program instruction (for example, a programming module) such as a Read Only Memory (ROM), a Random Access Memory (RAM), and a flash memory. Additionally, a program instruction may include high-level language code executable by a computer using an interpreter in addition to machine code created by a complier. The hardware device may be configured to operate as at least one software module to perform an operation of the present disclosure and vice versa.

A module of a programming module according to an embodiment of the present invention may include at least one of the above-mentioned components or additional other components. Or, some programming modules may be omitted. Operations performed by a module, a programming module, or other components according to an embodiment of the present invention may be executed via a sequential, parallel, repetitive or heuristic method. Additionally, some operations may be executed in a different order or may be omitted. Alternatively, other operations may be added.

Also, embodiments shown in the specification and drawings are provided as examples to describe technical content and help understanding, but do not limit the scope of the present invention. Accordingly, it should be interpreted that besides the embodiments of the present invention listed herein, all modifications or modified forms derived based on the technical ideas of the present invention are included within the scope of the present invention, as defined by the appended claims and their equivalents.

Figure 4:
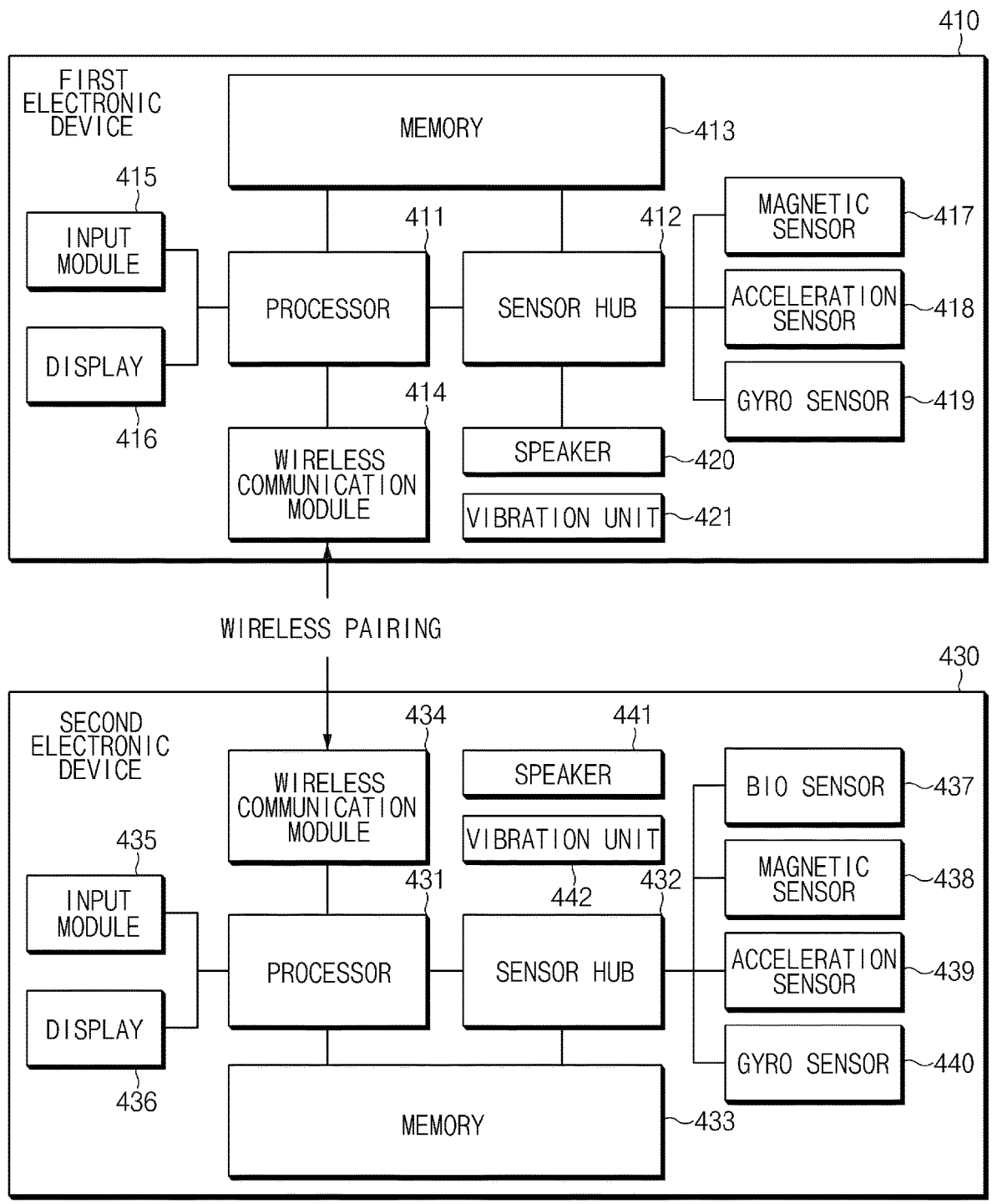
FIG. 4 is a block diagram illustrating a mutual connection of electronic devices according to an embodiment of the present invention.

FIG. 4 is a block diagram illustrating a mutual connection of electronic devices according to an embodiment of the present invention.

Referring to FIG. 4, a first electronic device 410 and a second electronic device 430 are connected to each other via wireless pairing. Or, the first electronic device 410 and the second electronic device 430 may be connected to each other via a wireless/air interface (for example, via Wi-Fi or a cellular network). The first electronic device 410 and the second electronic device 430 may be configured in various embodiments of the present invention. According to an embodiment of the present invention, the first electronic device 410 and the second electronic device 430 may be understood as a main electronic device and an auxiliary electronic device, respectively. In more detail, the main electronic device (for example, the first electronic device 410) may be a smartphone and the auxiliary electronic device (for example, the second electronic device 430) may be a smart watch. According to an embodiment of the present invention, the main electronic device may be an electronic device having at least high performance or high capacity in comparison to the auxiliary electronic device. According to an embodiment of the present invention, the auxiliary electronic device may be a portable wearable electronic device such as Galaxy Gear™ or Google Glass™. However, according to an embodiment of the present invention, there may be several criteria to distinguish main and auxiliary and the main electronic device in various embodiments may function as the auxiliary electronic device in other embodiments. For example, when a user directly controls a smartphone and indirectly controls a tablet via the smartphone, the smartphone may be understood as the main electronic device and the tablet may be understood as the auxiliary electronic device (even when the performance or capacity of the tablet is much better). However, in the contrary case, that is, when a user directly controls a tablet and indirectly controls a smartphone, the main electronic device becomes the tablet and the auxiliary electronic device may be the smartphone. According to an embodiment of the present invention, the auxiliary electronic device connected to the main electronic device may be specified by a user or configured.

The first electronic device 410 includes at least one of a processor 411, a sensor hub 412, a memory 413, a wireless communication module 414, an input module 415, a display 416, a magnetic sensor (e.g., a compass) 417, an acceleration sensor (e.g. an accelerometer) 418, a gyro sensor (e.g. a gyroscope) 419, a speaker 420, and a vibration unit 421. The shown configuration is exemplary and the electronic device 410 may further selectively include some components included in the electronic device 101 or the hardware 200 shown in FIG. 1 or 2.

Among components of the first electronic device 410, the processor 411 may be understood as a first control module (or a main processor module) and the sensor hub 412 may be understood as a second control module (or an auxiliary processor module). A plurality of sensors (for example, the magnetic sensor 417, the acceleration sensor 418, and the gyro sensor 419) may be separately connected to the sensor hub 412 with respect to the processor 411. Accordingly, sensors may operate regardless of a state of the processor 411 (for example, when the processor 411 is in a sleep state). According to an embodiment of the present invention, when it is impossible or inappropriate for the sensor hub 412 to process data obtained from the sensors, the sensor hub 412 may request the processor 411 to process the data. In this case, when the processor 411 is in a sleep state (or in a deactivated state), a wake up signal or a signal similar thereto (for example, a request signal) is transmitted to the processor 411.

The sensor hub 412 controls the sensors, the sensor hub 412 does not limit a control target to the sensors in terms of the auxiliary control module or the second control module. For example, the sensor hub 412 may directly process some of the signals (for example, RF signals received via a BT antenna) received from the wireless communication module 414 or may transmit a request to the processor 411 for signal processing. According to an embodiment of the present invention, the sensor hub 412 may be understood as serving a "hub" role to relay between other various components included in the processor 411 and the first electronic device 410. A solid line representing a connection relationship or a control relationship between shown components is exemplary and may be logically modified without limitation.

The second electronic device 430 includes at least one of a processor 431, a sensor hub 432, a memory 433, a wireless communication module 434, an input module 435, a display 436, a bio sensor 437, a magnetic sensor 438, an acceleration sensor 439, a gyro sensor 440, a speaker 441, and a vibration unit 442. The shown configuration is exemplary and the second electronic device 430 may further selectively include some components included in the electronic device 101 or the hardware 200 shown in FIG. 1 or 2. Although it is shown in FIG. 4 that the second electronic device 430 further includes the bio sensor 437 in comparison to the first electronic device 410, this is not understood as limiting the configuration of the second electronic device 430. The shown example should be understood that the second electronic device 430 includes components (for example, the processor 431, the sensor hub 432, and the wireless communication module 434) corresponding to the first electronic device 410 and may include additional components (for example, the bio sensor 437). In an embodiment of the present invention, some corresponding configurations among the components of the first electronic device 410 may be omitted from the second electronic device 430. For example, the sensor hub 432 may be omitted from the second electronic device 430. In this case, sensors (for example, the bio sensor 437, the magnetic sensor 438, the acceleration sensor 439, and the gyro sensor 440) may be directly controlled by the processor 431. Or, for example, when the sensor hub 432 is omitted from the second electronic device 430, sensors (for example, the bio sensor 437, the magnetic sensor 438, the acceleration sensor 439, and the gyro sensor 440 or some other sensors) of the second electronic device 430 may be controlled and/or processed by the processor 411 (or the sensor hub 412) in the first electronic device 410.

The first electronic device 410 and the second electronic device 430 may be connected to each other via their respective wireless communication modules 414 and 434 and may exchange data after forming a pairing state. In this specification, "pairing" or "pairing state" may refer to a state in which at least two electronic devices are mutually connected to each other via wired/wireless communication. Pairing may be formed via wireless communication using an electronic device as a destination via access information of each electronic device such as a Media Access Control (MAC) address but may include a temporary connection state via a broadcasting or advertising message such as a beacon message. Additionally, the pairing state may include a connection state based on information for identifying a user such as a user account, for example, a Mobile Network Operators (MNOs) or manufacturers account identifier (ID), a cloud server ID, an International Mobile Subscriber Identity (IMSI), a mobile subscriber Integrated Services Digital Network (ISDN) number or a Mobile Station international ISDN (MSISDN) number, an International Mobile Equipment Identity (IMEI) or an Internet Protocol (IP) Multimedia Subsystem (IMS) Public User (IMPU) identity used in IMS based service, an IMS Private User Identity (IMPI), an IP address allocated to a device on a certain network, a user based account used in an electronic device or a certain application, bio-metric information, or a separator having a property for allowing bi-directional communication according to a communication bearer.

Figure 11:
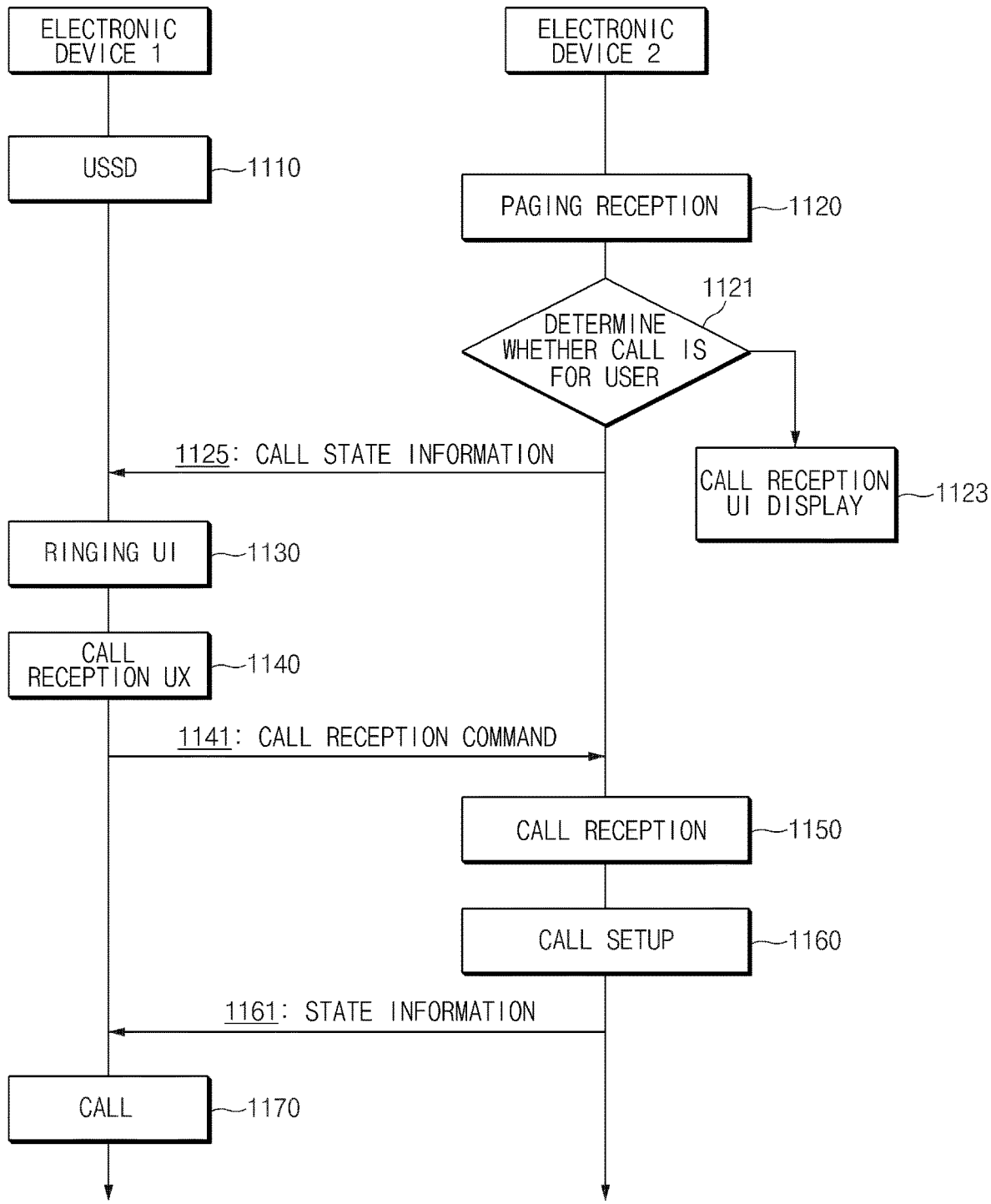
FIG. 11 illustrates a process for forwarding a call received by a first electronic device to a second electronic device by using Unstructured Supplementary Service Data (USSD) according to an embodiment of the present invention.
Figure 12:
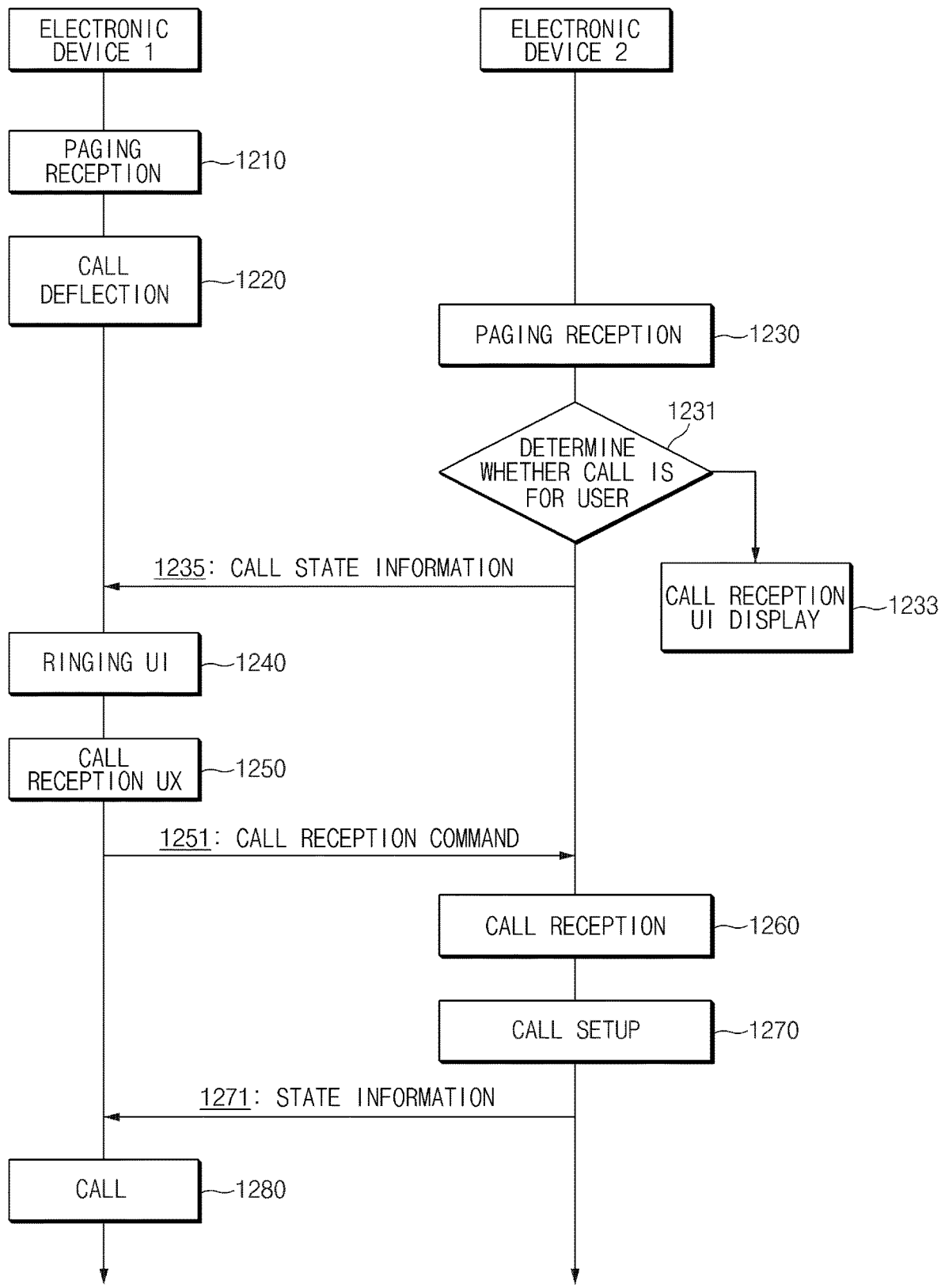
FIG. 12 illustrates a process for forwarding a call received by a first electronic device to a second electronic device by using call deflection according to an embodiment of the present invention.

In the present invention, an interoperating state may refer to a state in which functions or information of at least two electronic devices (for example, a smart watch and a smartphone) are shared in the pairing state. As another example, even when functions or information of at least two electronic devices are not shared, when functions or components of the at least two electronic devices perform activation, deactivation, or substitution operations, the at least two electronic devices are understood as being in an interoperating state. For example, in the case where two devices are communication-connected in any form may be understood as a pairing state, and in the case where two devices affect an operation or a function in any form may be understood as being in an interoperating state. For example, an interoperating state may occur absent a pairing state (as shown in FIGS. 11 and 12). When a first electronic device transmits a message (for example, Unstructured Supplementary Service Data (USSD)) for call forwarding to a network and a communication signal using the first electronic device as a destination is provided to a second electronic device based on the message on the network, although the first electronic device and the second electronic device are not directly connected to each other (it is regarded that they are indirectly connected via a communication network), they are understood as being in an interoperating state.

For example, while the first electronic device and the second electronic device are in a pairing state, if a first function of the first electronic device is performed in the second electronic device instead of in the first electronic device, among at least two tasks available for the first function of the first electronic device, when some tasks are performed in the first electronic device and the remaining tasks are performed in the second electronic device, this may refer to a state in which a synchronization operation is available by a user account corresponding to the first electronic device and the second electronic device.

As another example, while the first electronic device and the second electronic device are in a pairing state, if the first function of the first electronic device is performed in the second electronic device instead of in the first electronic device, all or some of the tasks of the first function of the first electronic device may be performed in the first electronic device. In this case, an interoperating state may refer to a state in which the first electronic device and the second electronic device may operate by using a predefined protocol.

In an embodiment of the present invention shown in FIG. 4, a conceptual diagram corresponding to a configuration of a portable terminal such as a smartphone is illustrated, but a main electronic device (for example, the first electronic device) may correspond to a smart home hub, a manufacturer server (for example, a Samsung server, a Samsung app server, and an iTunes store server), a business server (for example, a Google Play Store server or an AT&T telecommunications carrier server), or a mobile server in addition to a smartphone (or a similar mobile device). Additionally, an auxiliary electronic device (for example, the second electronic device) may include a smart watch, a smart car, a tablet, a Machine to Machine/Machine Type Communications (M2M/MTC) device, a Device to Device (D2D) device, an Internet of Things (IoT) device, or a smartphone.

Figure 5:
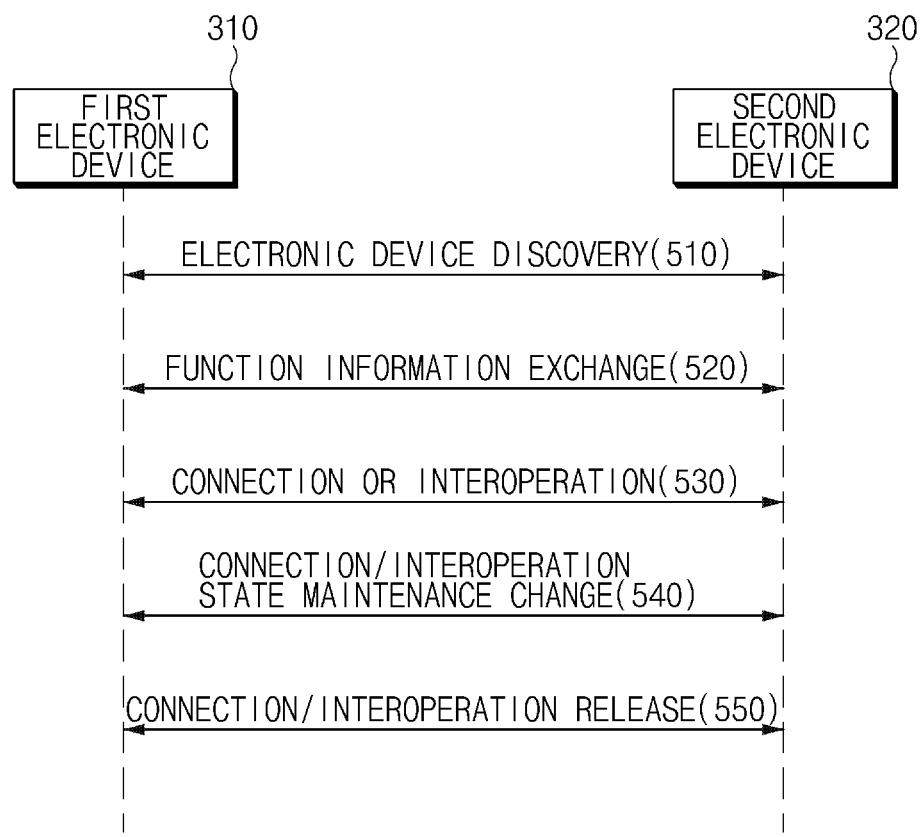
FIG. 5 illustrates a connection process between devices for a communication connection between an electronic device and another electronic device according to an embodiment of the present invention.

FIG. 5 illustrates a connection process between devices for a communication connection between an electronic device and another electronic device according to an embodiment of the present invention.

Referring to FIG. 5, the first electronic device 310 and the second electronic device 320 are connected to each other.

According to an embodiment of the present invention, an electronic device may be found in operation 510. For example, the first electronic device 310 may find the second electronic device 320 by using a Bluetooth Low Energy (BLE) scan. Once the second electronic device 320 is found, the first electronic device 310 establishes a (security) connection between the first electronic device 310 and the second electronic device 320. During connection establishment, according to a communication method used for making a connection, a connection channel may be set between the first electronic device 310 and the second electronic device 320. The first electronic device 310 and the second electronic device 320 connected in operation 510 may be understood as being in the above-mentioned pairing state.

Once a connection is established, information on functions performed in each electronic device or information on functions relating to each electronic device may be exchanged (which may be referred to as a capability exchange). According to an embodiment of the present invention, the electronic device 310 provides information on the first electronic device 310 to the second electronic device 320 in operation 520. Alternatively, the second electronic device 320 may provide information on the second electronic device 320 to the first electronic device 310 in operation 520.

Information relating to an electronic device (for example, information relating to the first electronic device 310) may include functions supported by an electronic device (for example, a service function) and network connection types/states. For example, the first electronic device 310 may include information on whether Wi-Fi or cellular communication support is available in the first electronic device 310. Furthermore, the information relating to an electronic device may include a network connection state (e.g. On/Off) of each (wireless) communication module (for example, BT, Wi-Fi, cellular, and so forth). The information on an electronic device may include an amount of remaining battery power, a network (wireless communication) connection state, SIM information on an electronic device, an IP address, network (wireless communication) identification information such as MAC address, types of sensors (for example, a position sensor, a gesture sensor, a gyro sensor, a pressure sensor, a magnetic sensor, an acceleration sensor, a grip sensor, a proximity sensor, an RGB sensor, a bio sensor, a temperature/humidity sensor, an illumination sensor, a UV light sensor, an e-nose sensor, an EMG sensor, an EEG sensor, an ECG sensor, a PPG sensor, or a fingerprint sensor) mounted in an electronic device, On/Off information of each sensor, and types of information (for example, GPS/position information, altitude, speed, intensity, brightness, temperature, and so forth) obtained or obtainable from various sensors. Additionally, the information on an electronic device may include information on the performance of a processor (for example, a processor 120, an application processor 210, a processor 411, or a processor 431) mounted in an electronic device, the capacity of a memory mounted in an electronic device, information on bandwidth, information on the characteristics of an antenna mounted in an electronic device, information on the performance (pixel rating) of a camera mounted in an electronic device, and information on a communication method (for example, $3^{rd}$ Generation (3G), $4^{th}$ Generation/Long Term Evolution (4G/LTE), and so forth) that an electronic device supports.

In operation 530, the first electronic device 310 and the second electronic device 320 are connected to, or interoperate with, each other. For example, based on function information exchanged with the second electronic device 320, the first electronic device 310 may deactivate a specified function/module therein that is performable in the second electronic device 320 while maintaining a connection state with the second electronic device 320. For example, while maintaining a connection state with the second electronic device 320 based on function information exchanged with the second electronic device 320, the first electronic device 310 may deactivate a specified function/module therein that is performable in the second electronic device 320. For example, when the first electronic device 310 is a smartphone and the second electronic device 320 is a smart watch, a call function may be available via a communication network in both the smartphone and the smart watch. In this case, as the call function of the smart watch is delegated to the smartphone, a communication module of the smart watch may be deactivated.

As another example, the first electronic device 310 may be a smartphone and the second electronic device 320 may be telematics or other electronic devices for a vehicle mounted in a smart car. In an embodiment of the present invention, although both the smartphone and the electronic device for a vehicle include a position recognition module (for example, a position sensor or a GPS module), the location recognition module of the electronic device for the vehicle may have relatively greater accuracy. In another embodiment of the present invention, position recognition modules in the smartphone and the electronic device for a vehicle have similar performance but the amount of remaining battery power of the smartphone may be low (for example, less than 20%). Such information may be exchanged in operation 520 and may be shared by both electronic devices. The first electronic device 310 (for example, a smartphone) may deactivate a position recognition module included in the first electronic device 310 and may use position information received from the second electronic device 320 (for example, an electronic device for a vehicle). In an embodiment of the present invention, as the first electronic device 310 and the second electronic device 320 share a resource (for example, HardWare (HW) and/or SoftWare (SW) modules/functions) or information, an overall efficiency improvement (for example, the battery consumption reduction of an electronic device of which a function/module is deactivated) between electronic devices may be obtained.

According to an embodiment of the present invention, an overlapping resource (e.g., function, sensor, and so forth) included in interoperated devices (e.g., the first electronic device 310 and the second electronic device 320) may be selectively managed or used according to a condition or state of the interoperated devices. The resource may include both a hardware resource and a software resource. For example, the resource may include a sensor (for example, a position sensor/GPS, a gesture sensor, a gyro sensor, a pressure sensor, a magnetic sensor, an acceleration sensor, a grip sensor, a proximity sensor, an RGB sensor, a bio sensor, a temperature/humidity sensor, an illumination sensor, a UV light sensor, an e-nose sensor, an EMG sensor, an EEG sensor, an ECG sensor, a PPG sensor, or a fingerprint sensor), a communication module (for example, a communication modem, a communication processor (CP), a Wi-Fi modem, a BT modem, an antenna, and so forth), an application processor (AP), a GPU, an ISP, and a camera sensor/processor.

For example, in an embodiment of the present invention shown in FIG. 4, when the performance of the processor 431 in the second electronic device 430 is relatively greater than that of the processor 411 in the first electronic device 410 or greater than a reference value (or a reference ratio), functions of the processor 431 are identical or similar to functions of the processor 411, or a state/condition (for example, a battery state) of the second electronic device 430 is relatively good, the first electronic device 410 may allow the processor 411 to enter a deactivation state (or a low power and sleep state) and may then transmit information/data collected via a sensor (for example, the magnetic sensor 417, the acceleration sensor 418, and the gyro sensor 419) to the second electronic device 430 via the wireless communication module 414 by using the sensor hub 412. The second electronic device 430 may process the information/data received via the wireless communication module 434 by using the processor 431. Furthermore, the second electronic device 430 may provide the processed information/data to the first electronic device 410 via the wireless communication module 434. The first electronic device 410 may receive a data processing result and may then display it on the display 416.

According to an embodiment of the present invention of FIG. 5, an additional operation according to the deactivation of a function/module of the first electronic device 310 may be requested from at least one of the first electronic device 310 and the second electronic device 320. For example, when a function (for example, a voice call) is deactivated in the first electronic device 310, another electronic device (for example, the second electronic device 320) in an interoperating state (or a pairing/connection state) with the first electronic device 310 may perform the specific function of the first electronic device 310 instead of the first electronic device 310. When deactivating a function, the first electronic device 310 may perform an operation (for example, a voice call) corresponding to the function in the second electronic device 320 and then may provide command or control information for providing a corresponding result to the first electronic device 310 (for example, voice data transmission via the connection established in operation 520), to the second electronic device 320.

In operation 540, a pairing or interoperating state may be maintained continuously or changed. For example, although a battery state of the second electronic device 320 may be better than a battery state of the first electronic device 310 when the electronic devices enter an interoperating state (for example, operation 530), as the specified function of the first electronic device 310 is deactivated and a corresponding function is performed by the second electronic device 320, the battery situations of the first electronic device 310 and the second electronic device 320 may be reversed. The first electronic device 310 may realize or receive various status of such an interoperating second electronic device 320 periodically or when an event (for example, a notification message for a battery state) or a request occurs. According to the information detected by the first electronic device 310, a function performed by the second electronic device 320 instead of the first electronic device 310 may be performed by the first electronic device 310 again and accordingly, a deactivated module in the first electronic device 310 may be activated.

According to an embodiment of the present invention, when the first electronic device 310 (for example, a main electronic device) and the second electronic device 320 (for example, an auxiliary electronic device such as a smart watch) interoperate with each other (for example, operation 530), a communication module (for example, a CP operating for a communication modem or a cellular network) of the first electronic device 310 may be used for a communication means of the second electronic device 320. In this case, the communication module mounted in the second electronic device 320 may be disabled for resource efficiency or battery saving. Additionally, the communication module may be another communication module other than the communication modem or a communication module used for pairing. For example, a communication module in pairing, detected by the second electronic device 320, is BT and in this case, a communication module relating to Wi-Fi may be disabled. According to various embodiments, when the intensity of a signal received from the first electronic device 310 is weaker than a predetermined value (Received Signal Strength Indicator (RSSI)<a predefined reference value), a battery state of the first electronic device 310 is less than a certain value, the first electronic device 310 executes an application (for example, video playback, recording, games, and so forth), a communication modem of the first electronic device 310 starts to be used for the first electronic device 310, or a specified notification is provided from the first electronic device 310, a connection state or a resource state of an electronic device may be changed. For example, a communication modem or a CP of the second electronic device 320 may be activated (e.g. operated).

According to an embodiment of the present invention, when the first electronic device 310 (for example, a main electronic device) and the second electronic device 320 (for example, an auxiliary electronic device) are connected to each other, the first electronic device 310 may deactivate (or reactivate) a function/resource of the second electronic device 320. In this case, the first electronic device 310 may operate a function/resource of the first electronic device 310 corresponding to a function/resource deactivated in the second electronic device 320. In another embodiment of the present invention, when the first electronic device 310 and the second electronic device 320 are in a pairing state, the first electronic device 310 may deactivate its specified function/resource and may then request the second electronic device 320 to allow a corresponding function/resource of the second electronic device 320 to operate instead.

In operation 550, the first electronic device 310 and the second electronic device 320 are disconnected. The first electronic device 310 continuously monitors state information of the first electronic device 310 or the second electronic device 320 and sets a disconnection condition. For example, when a battery of an electronic device becomes lower than a predetermined level or the intensity of a signal (for example, an RSSI) received from the second electronic device 320 falls below a predetermined value as a distance between the first electronic device 310 and the second electronic device 320 increases, the connection is released. According to an embodiment of the present invention, while the first electronic device 310 (for example, a smartphone) is connected to the second electronic device 320 (for example, an electronic device for a vehicle), when it is detected that a user of the first electronic device 310 exits a vehicle (for example, the detection of vehicle start-up OFF and vehicle door opening/closing), the connection may be released. According to an embodiment of the present invention, when a predetermined connection time lapses, the connection may be released. When the connection is released, a function transferred between devices may be returned to an original state (for example, the activation of a deactivated function after transfer).

Figure 6:
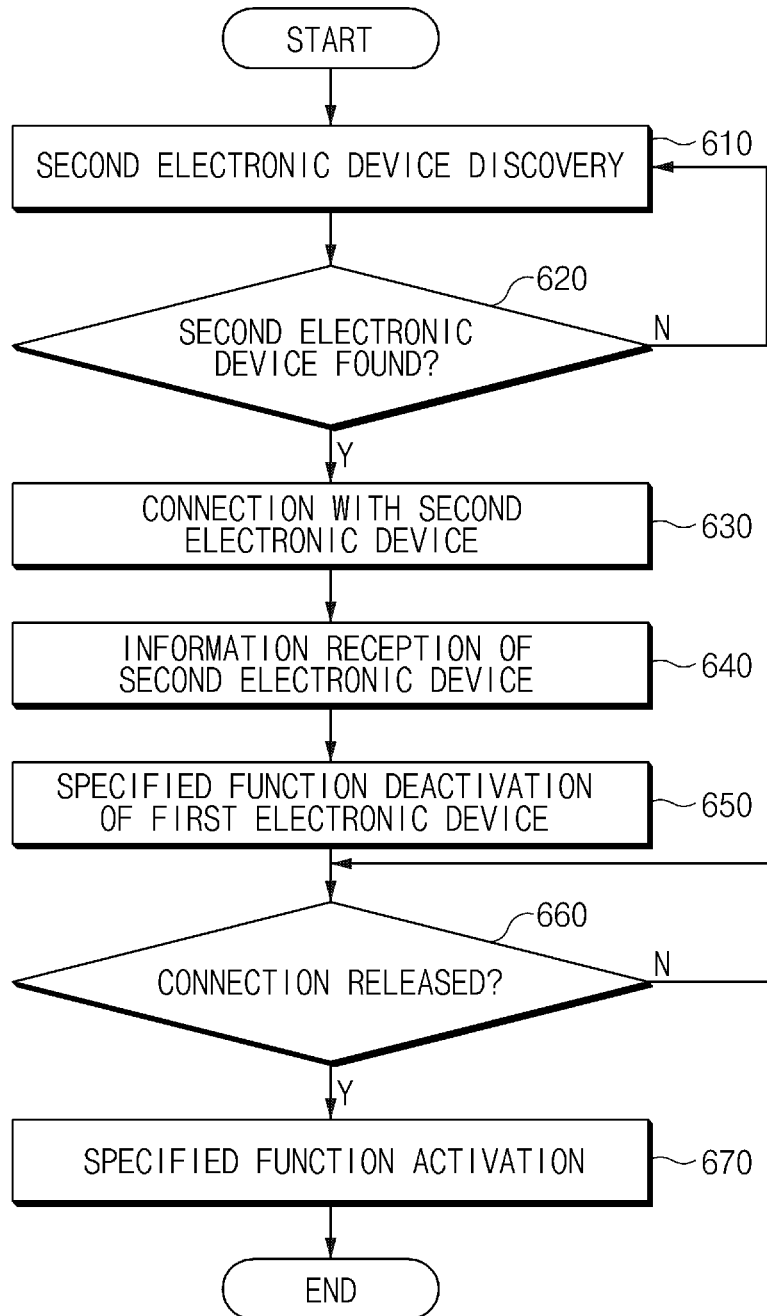
FIG. 6 is a flowchart of a process of making a connection between electronic devices according to an embodiment of the present invention.

FIG. 6 is a flowchart of a process of making a connection between electronic devices according to an embodiment of the present invention.

According to an embodiment of the present invention, a first electronic device searches for a second electronic device in operation 610. The first electronic device may search for the second electronic device via a wireless communication such as BT, BLE, Zigbee, IrDA, InfraRed LED (IRLED), Advanced and adaptive Network Technology Plus (ANT+), Wi-Fi, and Institute of Electrical and Electronics Engineers (IEEE) 802 standard. Additionally, the first electronic device may search for the second electronic device based on an identification (ID), such as a user account. For example, a user may manage various devices, for example, smartphones, tablets, smart watches, laptop PCs, smart cameras, smart TVs, smart cars, by using one user account. When the first electronic device attempts to interoperate with another electronic device based on the user account of the first electronic device, it may be checked that an electronic device included in a list obtained by user account information is connectible by the first electronic device.

According to an embodiment of the present invention, whether the second electronic device is found is determined in operation 620. If the second electronic device is found (e.g. discovered), the process proceeds to operation 630. If the second electronic device is not found, the process proceeds to operation 610 and performs a search operation continuously. However, according to an embodiment of the present invention, if the second electronic device is not found for a predetermined time, the process may be terminated.

In operation 630, the first electronic device establishes a connection with the found second electronic device. The connection may be established via a wireless communication such as BT, BLE, Zigbee, IrDA, IRLED, ANT+, Wi-Fi, IEEE 802, 3G, and LTE. However, according to an embodiment of the present invention, for example, when a smartphone is connected by wire to a desktop PC, a smartphone is connected to a smart watch, or a smartphone or a smart watch is connected by wire to an electronic device for a vehicle, the connection may be established using a wired connection (for example, via LAN and USB communication).

According to an embodiment of the present invention, the first electronic device may receive information from the second electronic device in operation 640. In operation 640, the first electronic device may provide information thereon to the second electronic device. In operation 640, information transmission between electronic devices may be performed via a server.

According to various embodiments, in operation 650, the first electronic device may deactivate a specified function thereof based on information (for example, a command on specified function performance or a signal for notifying that devices are connected to each other) received from at least a second electronic device. Herein, a specified function may be a function that is possible to be performed by the second electronic device, and that increases the reliability of a performance result, improves the power management efficiency of an electronic device, or matches a user's intention. The first electronic device may perform an additional operation to allow a deactivated function to be performed by the second electronic device. For example, when a communication modem of the first electronic device is OFF and a voice call is performed by using a communication modem of the second electronic device, a BT voice channel is activated between the first electronic device and the second electronic device. Then, voice data received by the second electronic device is transmitted to the first electronic device and voice input via a mic (e.g. microphone) of the first electronic device is transmitted to the second electronic device via the BT voice channel. Thus, the voice call is continued. Or, according to an embodiment of the present invention, a function of the second electronic device may be deactivated in the above case (after operation 640). Accordingly, the above appropriate operation may occur in the first electronic device and the second electronic device.

According to an embodiment of the present invention, whether the first electronic device and the second electronic device are disconnected may be determined in operation 660. For example, when the intensity of a signal falls below a predetermined reference value as a distance between the first electronic device and the second electronic device increases, or when a battery state of the second electronic device deteriorates, or by a user input, the first electronic device and the second electronic device may be disconnected. When the disconnection occurs, the process proceeds to operation 670 and when the connection is maintained continuously, an interoperating state may be maintained continuously.

According to an embodiment of the present invention, when the first electronic device and the second electronic device are disconnected, the first electronic device may reactivate a deactivated function in operation 670. Furthermore, the first electronic device may release all additional operations for performing a corresponding function in the second electronic device. Furthermore, the first electronic device may retrieve information provided to the second electronic device or may request the deletion of information in order to perform a function.

Figure 7:
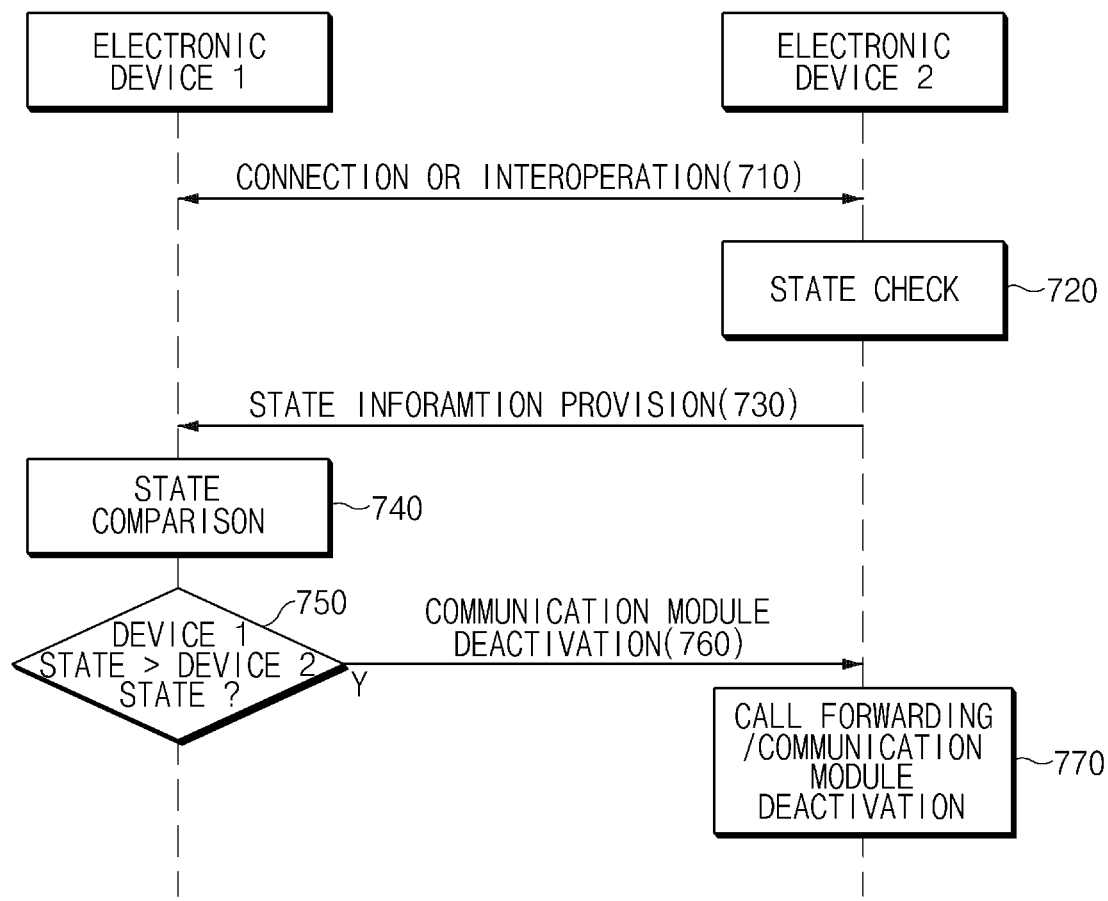
FIG. 7 illustrates deactivation of a resource based on performance of a component in an electronic device according to an embodiment of the present invention.

FIG. 7 illustrates deactivation of a resource (for example, a communication modem) based on the performance of a component in an electronic device according to an embodiment of the present invention.

According to an embodiment of the present invention, an interoperation of a first electronic device (for example, the first electronic device 310) and a second electronic device (for example, the second electronic device 320) may be established in operation 710. Operation 710 corresponds to operation 610 to 630 in FIG. 6. In FIG. 7, in operation 710, the first electronic device transmits a message requesting information to the second electronic device. For example, the first electronic device transmits a message requesting the performance or version information on a communication module (for example, a communication modem) mounted in the second electronic device, information on an amount of battery power remaining of the second electronic device, or SIM information (for example, an amount of remaining free call or free data) when the second electronic device includes a SIM.

According to an embodiment of the present invention, operation 710 may be performed based on a user account. For example, the first electronic device may obtain information of the interoperable second electronic device (for example, a list of devices using the same user account or connected user account) by using the user account information of the first electronic device. The first electronic device may search whether the second electronic device is within a searchable range of at least one communication module (for example, BT) of the first electronic device. When a second electronic device is within a searchable range of the first electronic device, the process proceeds to operation 720. When the second electronic device is not within a range in which the second electronic device is connectable via a short-range network (for example, BT, BLE, NFC, IrDA, and so forth), for example, the first electronic device may perform a function (for example, the reception of an incoming call to the second electronic device) of the second electronic device in a different way, which is described below.

According to an embodiment of the present invention, the second electronic device checks a state of a resource included therein in operation 720.

According to an embodiment of the present invention, the second electronic device provides the checked resource state to the first electronic device in operation 730. For example, information on the performance or version of a communication modem functionally connected to the second electronic device may be provided. According to an embodiment of the present invention, the modem may support both call service and data service or may support only data service according to a device.

In operation 740, the first electronic device compares a resource state of the first electronic device and a state of the second electronic device. For example, the first electronic device may compare the performance information on the communication modem of the first electronic device with that of the second electronic device or may compare the amount of battery power remaining in the first electronic device with that of the second electronic device.

If it is determined in operation 750 that a resource state of the first electronic device is better than a resource state of the second electronic device, the process proceeds to operation 760. If it is determined that the resource state of the first electronic device is not better than the resource state of the second electronic device, the first electronic device may not perform an operation for relaying a function of the second electronic device.

In operation 760, the first electronic device provides a deactivation (for example, communication modem OFF or disable) command or message of the second electronic device to the second electronic device. When the command or message is received by the second device, the second electronic device deactivates the communication modem of the second electronic device and delivers (for example, call forwarding) a call for the second electronic device to the first electronic device.

For example, the average power consumption of a wireless communication is 1.4 mW to 2 mW in the case of BT 4.0, 120 mW in the case of Wi-Fi, 800 mW in the case of a 3G network, and 1080 mW in the case of an LTE network. According to an embodiment of the present invention, when a smartphone (e.g., the first electronic device) and a smart watch (e.g., the second electronic device) are connected via BT or BLE communication, in order for the efficiency of a resource, the communication modem of a smart watch having a small battery capacity is turned off and the modem of the smartphone may be used instead of the communication modem of the smart watch.

According to an embodiment of the present invention, when each of the first electronic device and the second electronic device includes a SIM and has a different phone number (i.e., 2 SIMs—2 phone numbers), as the communication module of the second electronic device is deactivated, the second electronic device generates Unstructured Supplementary Services Data (USSD) and transmits it to a network, so that call forwarding may be provided to a device having a turned-on modem (for example, the first electronic device). According to an embodiment of the present invention, a device (for example, the second electronic device) deactivating a communication module may automatically forward a call to a device (for example, the first electronic device) having an activated communication module.

According to an embodiment of the present invention, although each device includes a SIM but has the same phone number (i.e., 2 SIMs—1 phone number), when a call is made to a corresponding phone number, a carrier network checks the identifiers (IDs) of the devices mapped to the phone number and provides paging to both SIMs. Thus, even when modems of some devices are turned off, a call may be received. According to an embodiment of the present invention, a carrier network implements call reception via intelligent networks such as Customized Application for the Mobile network Enhanced Logic (CAMEL) in the case of a Circuit Switched (CS) based call, or via a function such as call forking of an IP Multimedia Subsystem (IMS) in the case of a Voice over LTE (VoLTE) based call.

An embodiment of the present invention relating to receiving a call by selectively turning off a modem of an electronic device includes the cases where the number of SIMs is identical to or different from the number of phone numbers, as mentioned above.

In an embodiment of the present invention relating to FIG. 7, an operation for comparing states of the first electronic device and the second electronic device and deactivating the communication module of the second electronic device according to a comparison result is described. However, a series of activation and/or deactivation operations may be performed continuously by changing the roles of the first electronic device and the second electronic device. For example, the first electronic device or the second electronic device may perform a state comparison operation (operation 740) continuously, periodically, or arbitrarily. If it is determined after operation 770 that it is more efficient to perform a call function in the second electronic device rather than to perform a call function in the first electronic device (for example, the amount of battery power remaining in the first electronic device falls below a predetermined value), the communication module in the second electronic device is activated and the communication module in the first electronic device is deactivated. An embodiment of the present invention relating to the above example is described below with reference to FIG. 8.

Figure 8:
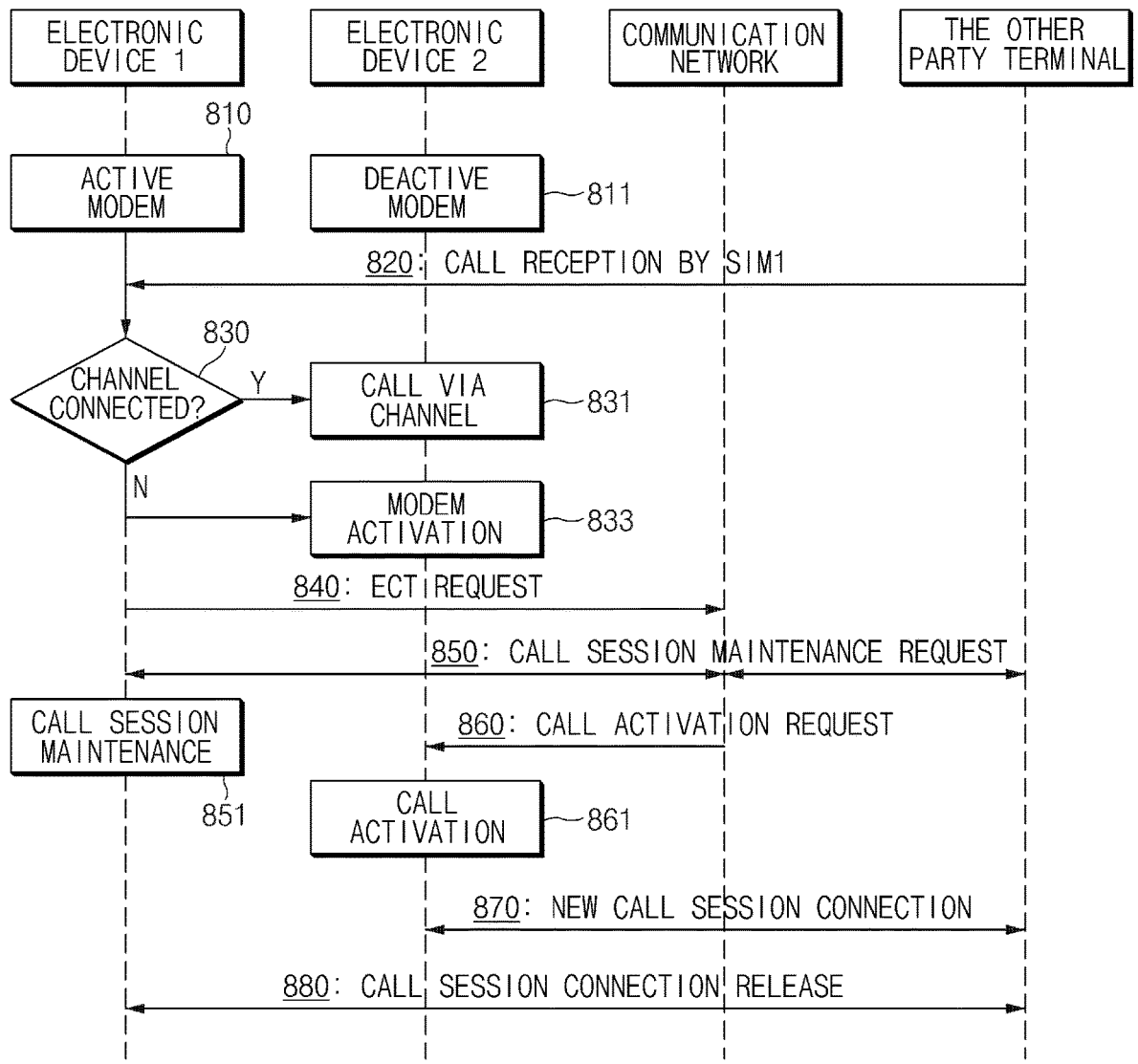
FIG. 8 illustrates a process of relaying a call between electronic devices according to an embodiment of the present invention.

FIG. 8 illustrates a process of relaying a call between electronic devices according to an embodiment of the present invention.

Referring to FIG. 8, a modem of a first electronic device is activated in operation 810 and a modem of a second electronic device is deactivated in operation 811. Operations 810 and 811 may be performed simultaneously or sequentially. Additionally, the activation/deactivation operations (that is, operations 810 and 811) of the modem may be performed based on an operation for comparing the resource/function information of the first electronic device and the second electronic device or the resource/function states of the first electronic device and the second electronic device (for example, some operations of the processes described above and illustrated in FIGS. 5 to 7).

Each of the first electronic device and the second electronic device includes a SIM, respectively. For example, the first electronic device includes a SIM 1 and the second electronic device includes a SIM 2. The first electronic device and the second electronic device are identified via a user account for each electronic device. Another party's terminal attempting a call to the first electronic device or the second electronic device attempts a call connection to the SIM but may also attempt a call connection based on a user account according to an embodiment of the present invention.

According to an embodiment of the present invention, the terminal attempts a call to the SIM 1 in operation 820. The first electronic device receives the incoming call to SIM 1. According to an embodiment of the present invention, the terminal attempts a call to a user account of an electronic device and in this case, since the modem of the second electronic device is deactivated in operation 811, the first electronic device receives the call.

According to an embodiment of the present invention, although the first electronic device (for example, a smartphone) must be removed from a pocket or a bag for a user to receive an incoming call, when the second electronic device is a wearable device (for example, a smart watch or glass), a user immediately receiving a call is possible. According to an embodiment of the present invention, the first electronic device sets a communication channel with the second electronic device (for example, a voice channel connected via BT) and provides voice data corresponding to the call received by the first electronic device to the second electronic device in operation 830. Via such an implementation, a user of the first electronic device or the second electronic device may speak with a user of the other party's terminal via a communication channel connected between the first electronic device and the second electronic device in operation 831. According to an embodiment of the present invention, a user of the first electronic device or the second electronic device may not recognize whether a call is made by using the modem of the first electronic device or the second electronic device.

In operation 830, when a channel connection between the first electronic device and the second electronic device is released or a channel connection fails, the first electronic device may request the second electronic device to activate its modem. In operation 833, the second electronic device activates its modem.

In operation 840, in order to prevent a call with the other party from being interrupted, the first electronic device performs Explicit Call Transfer (ECT). ECT is requested from the first electronic device to a telecommunication carrier network (for example, a Base Station (BS)), the BS requests the holding of a call session connected between the other party's terminal and the first electronic device.

When the first electronic device and the other party's terminal receive a request to maintain a call session from the telecommunication carrier in operation 850, the first electronic device maintains the call session in operation 851. In this case, the other party's terminal may also perform an operation corresponding to the first electronic device. In operation 860, the BS delivers a call activation result to the second electronic device via the modem of the second electronic device. In operation 861, the second electronic device performs a call activation operation using its modem in response to the activation request.

When it is determined that the call activation operation (that is, operation 861) of the second electronic device is performed, a new call session between the other party's terminal and the second electronic device is connected in operation 870, and the call session connected between the other party's terminal and the first electronic device is released in operation 880. Operations 870 and 880 may be performed simultaneously or sequentially.

Through such processes, even when a connection between the first electronic device and the second electronic device is terminated while a call service of the first electronic device is used through the second electronic device, by turning on the communication modem of the second electronic device and performing ECT in the first electronic device, a call session is forwarded from the first electronic device to the second electronic device. Thus, without a user's input or recognition, a call service may be maintained seamlessly.

According to an embodiment of the present invention, the communication modem of a smartphone (for example, the first electronic device) is in an activation state and the communication modem of a smart watch (for example, the second electronic device) is in a deactivation state. Additionally, the smart watch relays a call, which is received via the modem of the smartphone, via a BT channel connected to the smartphone (for example, operation 810 to operation 831 of FIG. 8). Then, when a BT connection is terminated and movement of a user is detected in a smart watch, the modem of the smart watch is turned on and a service of the smartphone is relayed to the smart watch (for example, operation 833). The service may include a call service or all relay-available services using a resource in a device. Then, when BT pairing between devices is reconnected or a user movement is detected in the smartphone, a relayed service is automatically restored to the smartphone. For example, the modem of the smartphone is activated and processes corresponding to operations 840 to 880 are performed.

Figure 9:
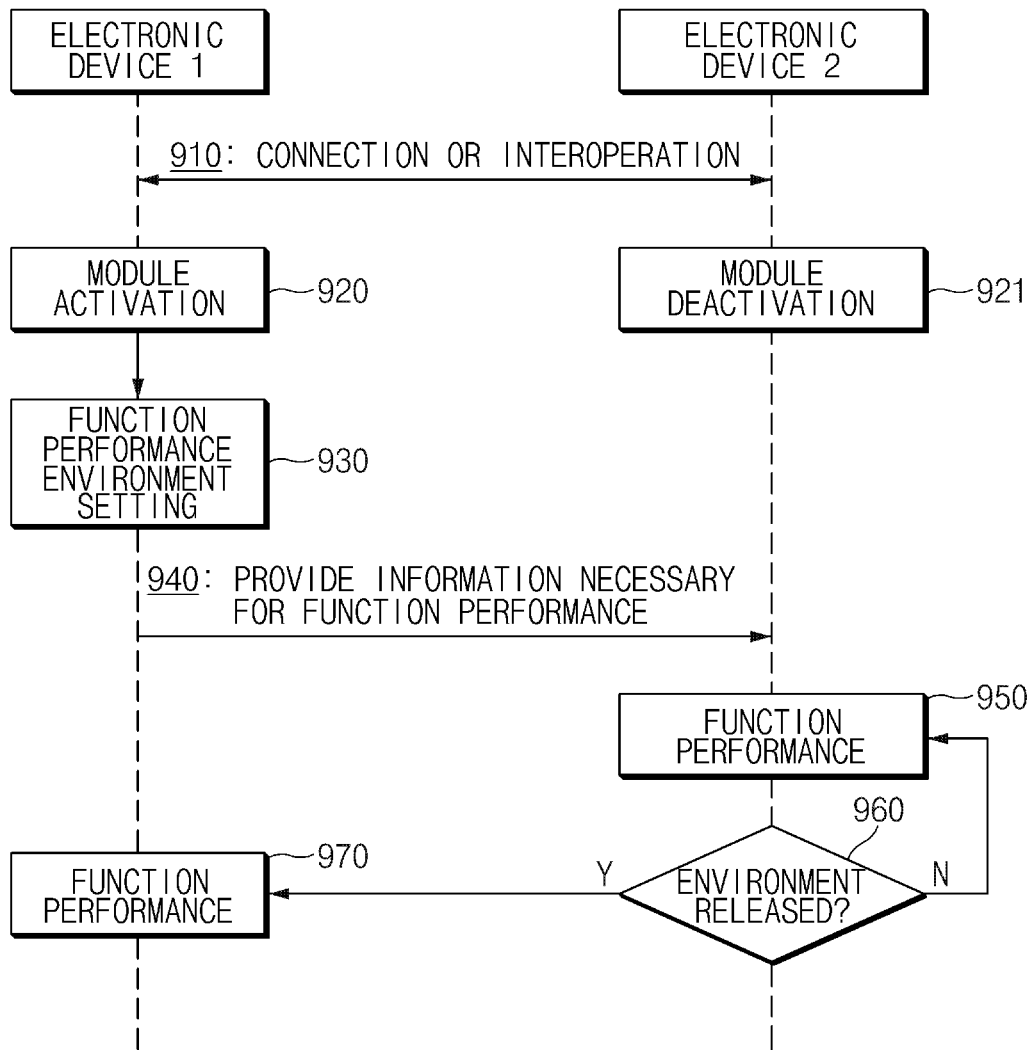
FIG. 9 illustrates a process of changing an electronic device that is performing a function according to an embodiment of the present invention.

FIG. 9 illustrates a process of changing an electronic device that is performing a function according to an embodiment of the present invention.

Referring to FIG. 9, according to an embodiment of the present invention, the first electronic device and the second electronic device are mutually connected to each other or interoperate with each other in operation 910. Operation 910 may include a connection of the first electronic device and the second electronic device, an exchange of resource information including functions or modules, and a determination of a function to be deactivated among overlapping functions and a device to be deactivated.

According to an embodiment of the present invention, a module of the first electronic device is activated in operation 920 and a module of the second electronic device is deactivated in operation 921. The module may be a modem performing a communication function, for example. According to an embodiment of the present invention, the module may be a position sensor, a processor, and so on.

In operation 930, a preference setting for function performance is performed. For example, when it is intended that the modem of the second electronic device is off and a communication function using the modem of the first electronic device is performed in the second electronic device, a preference setting for performing a communication function using the modem of the first electronic device is performed in the second electronic device. According to an embodiment of the present invention, for example, as described with reference to FIG. 8, a BT channel connection between the first electronic device and the second electronic device is established to relay a voice call performed with the first electronic device to the second electronic device.

According to an embodiment of the present invention, as a communication channel (for example, a BT channel) is formed between the first electronic device and the second electronic device in operation 910, a module (for example, a communication module) is deactivated in the second electronic device in operation 921. For example, although a connection operation of the first electronic device and the second electronic device is performed in operation 910, transmission of an additional function or information may be omitted and a modem may be activated or deactivated according the recognition of a channel formation (for example, a profile relating to a channel formation, Hands-Free Profile (HFP) for a call, or types of protocols for media transmission. For example, a Bluetooth headset may be connected (for example, BT connection) to a wearable device such as a smart watch, and when the Bluetooth headset does not support a communication function such as a cellular network, the communication module (for example, a 3G communication module) of the smart watch may not be deactivated. As another example, a smartphone may be connected (for example, BT connection) to a wearable device such as a smart watch. In this case, the smartphone may support a communication function such as a cellular network and accordingly, the communication module of the smart watch may be deactivated.

In operation 940, information necessary for performing a corresponding function in the second electronic device is provided. For example, information that an environment for function performance is built, or information provided to a user using the second electronic device (for example, information that a voice call is made to the first electronic device), and information for device or user authentication may be provided together.

In operation 950, the second electronic device performs a corresponding function by using a module of the first electronic device. In operation 960, as a preference set for function performance is released or changed, if a function performance is no longer available in the second electronic device or is not efficient, the process proceeds to operation 970.

In operation 970, the first electronic device performs a function currently executed in the second electronic device sequentially. Then, the first electronic device retrieves from the second electronic device all information or services provided for function performance to the second electronic device.

When an environment for function performance is reestablished in the second electronic device, a function relayed to the first electronic device is re-performed again in the second electronic device, for example, repeating operations 930 to 950.

For example, when a call service of a smartphone (e.g., the first electronic device) is relayed to a smart watch (e.g., the second electronic device) (for example, operation 950), it may be a state inappropriate for performing a function by the smart watch, for example, the movement of the smart watch may stop, a bio signal may not be detected (this means that a user takes off the smart watch from the wrist), the smart watch may be in a charging state, or a user authentication may have failed (for example, operation 960). In this case, a call forward relayed to the smart watch is restored to the smartphone. Then, when an environment for function performance is reestablished (for example, the movement of a smart watch is detected, a bio signal is detected, charging is stopped, a BT channel is connected to the smartphone, or a user authentication is successful), the call of the smartphone is forwarded to the smart watch. According to an embodiment of the present invention, during call forwarding, a time limit may be set and the call forwarding may be set to be automatically released. For example, as information on a time for function performance is provided (for example, operation 940) and a call is received via call forwarding (for example, operation 950), when a time limit lapses (for example, operation 960), the call forwarding is released and the smartphone receives the call directly (for example, operation 970).

As another example, when a user carries one or more mobile devices (for example, the second electronic device) and enters a car, the devices deliver SIM information to an electronic device for the car (for example, the first electronic device) and receive communication service or position service via a modem of the electronic device for the car. When it is detected that the user exits the car (for example, operation 960), the at least one mobile device retrieves all delivered information and services.

According to an embodiment of the present invention, a plurality of electronic devices in an interoperating state maintains service by utilizing a resource of an electronic device being charged. For example, when each of a smartphone and a smart watch includes a SIM and has different phone numbers, if the smart watch is being charged, the call of the smartphone is received by using the modem of the smart watch. According to an embodiment of the present invention, via a method of delivering the SIM information of the smartphone by using a SIM Access Profile (SAP) via a network, an incoming call to the smartphone is received by using the modem of the smart watch. Then, when the smartphone has better user accessibility than the smart watch being charged, only the modem of the smart watch is used and an actual call reception operation (for example, a call reception acceptance, a call, and so forth) is performed by the smartphone. However, according to an embodiment of the present invention, an incoming call to the smartphone is received using the modem of the smart watch and a call reception operation is performed by the smart watch at the same time.

According to an embodiment of the present invention, when at least two devices interoperate with each other and the modems of the devices are each in an active state, if the battery power of a first device corresponds to a predetermined criterion (for example, less than 10% of a full charge), a service using the modem is relayed to another device having sufficient battery power, and the power consumption of the first device is reduced. According to an embodiment of the present invention, at least two devices obtain information on a battery or a modem via a short-range network such as BT. Additionally, when at least two devices are not within a distance in which they can be connected via a short-range network, information on a resource such as a battery is obtained by using a user account via an external service and a function is relayed. For example, in the situation where a smartphone is left at home or a call is not transmitted/received through the smartphone, information on several devices linked to account information is obtained by using user account information and an incoming call to the smartphone is received through another device (for example, a smart watch, a tablet, a smart home server, or an electronic device of a smart car).

According to an embodiment of the present invention, among a plurality of interoperating electronic devices, only the modem of an electronic device having a relatively large remaining free call or free data amount is turned on to perform the modem functions of the remaining electronic devices. The information on the remaining free call or free data amount may be stored in a device and may be exchanged, or may be obtained via user account information. According to an embodiment of the present invention, it may be automatically set or guided via a User Interface (UI) to allow a user to use the modem of a device having the relatively large remaining call or data amount.

According to a state of an interoperating device or a condition between devices, an On/Off, Sleep/Wake up, or Active/Inactive resource may be a sensor. For example, when at least two devices interoperate within a short distance (for example, within a BT connection range), at least one among overlapping sensors between the devices may be turned off. As another example, when a distance between interoperating devices is increased, only sensors of a moving device may be turned on. Additionally, a service delivered between devices may be displayed to be recognized by a user through a method such as a UI, an icon, a pop-up, or a haptic.

A function management method of an electronic device according to an embodiment of the present invention includes receiving, by a first electronic device, information relating to a second electronic device and deactivating at least one of functions or components of the first electronic device based on the received information.

According to an embodiment of the present invention, the method may further include establishing a connection with the second electronic device. The connection may be a wireless connection established using one of BT, BLE, Zigbee, IrDA, Wi-Fi, and a cellular network.

According to an embodiment of the present invention, information relating to the second electronic device includes information on at least one sensor included in the second electronic device, and an operation for deactivating at least one of functions or components of the first electronic device includes an operation for deactivating a function of at least one sensor of the first electronic device, which overlaps a function of a sensor included in the second electronic device.

According to an embodiment of the present invention, one of the first electronic device and the second electronic device may be a smartphone and the other may be an auxiliary device that is connected by wired or wirelessly connected to the smartphone. Additionally, the auxiliary device may be a wearable device.

According to an embodiment of the present invention, the method further includes an operation providing information for performing the deactivated function on the second electronic device.

According to an embodiment of the present invention, information relating to the second electronic device includes information on the amount of remaining battery power of the second electronic device, and an operation for deactivating at least one function of the first electronic device is performed when the amount of remaining battery power is greater than the amount of remaining battery power of the first electronic device.

According to an embodiment of the present invention, information relating to the second electronic device includes performance information on a processor of the second electronic device, and an operation for deactivating at least one function of the first electronic device is performed when the performance of the processor is greater than the performance of a processor of the first electronic device.

A communication method of an electronic device according to an embodiment of the present invention includes comparing, by the first electronic device, resource states of the first electronic device including a first communication module and the second electronic device including a second communication module, providing information relating to a state change of the second communication module to the second electronic device based on at least the comparison result, and receiving a communication signal for the first electronic device or the second electronic device via the first communication module.

According to an embodiment of the present invention, the communication signal received is forwarded to the first electronic device by using a message provided to a network when the second communication module is deactivated in the second electronic device.

According to an embodiment of the present invention, reception of the communication signal includes establishing a communication channel connection between the first electronic device and the second electronic device and transmitting data included in a communication signal received via the first communication module to the second electronic device via the channel.

According to an embodiment of the present invention, the communication signal is a voice call and the method includes activating the second communication module when the channel connection is released, requesting the maintenance of the communication signal to a network, and terminating the call session connected to the first communication module when the second communication module is activated and connecting the second communication module and the call session. Additionally, requesting maintenance includes performing ECT in the first electronic device.

An electronic device such as a smartphone may have various applications. For example, a smartphone may download media contents such as video or music and various data such as a document from a file server using an File Transfer Protocol (FTP) application. Additionally, a media contents streaming service may be provided via a video providing application (for example, YouTube).

In such a way, while an operation for communicating with an external device or an external server is performed, an electronic device may use an available communication means. For example, an electronic device may provide a service to a user via a wireless communication module (for example, the cellular module 221) or an RF module (for example, the RF module 229).

While an electronic device receives service (for example, data service) by using a communication resource, a voice call may occur. According to an embodiment of the present invention, data service and voice service may use different types of communication methods. For example, data service may be provided in LTE, but voice service may be provided in 3G. Additionally, for example, data service may be provided in a packet switching network, but voice service may be provided in a circuit switching network. According to an embodiment of the present invention, when a voice call is provided via Circuit Switched FallBack (CSFB), LTE service may not be provided continuously. In such a case, efficient service may be provided by using components mounted in different electronic devices.

Figure 10:
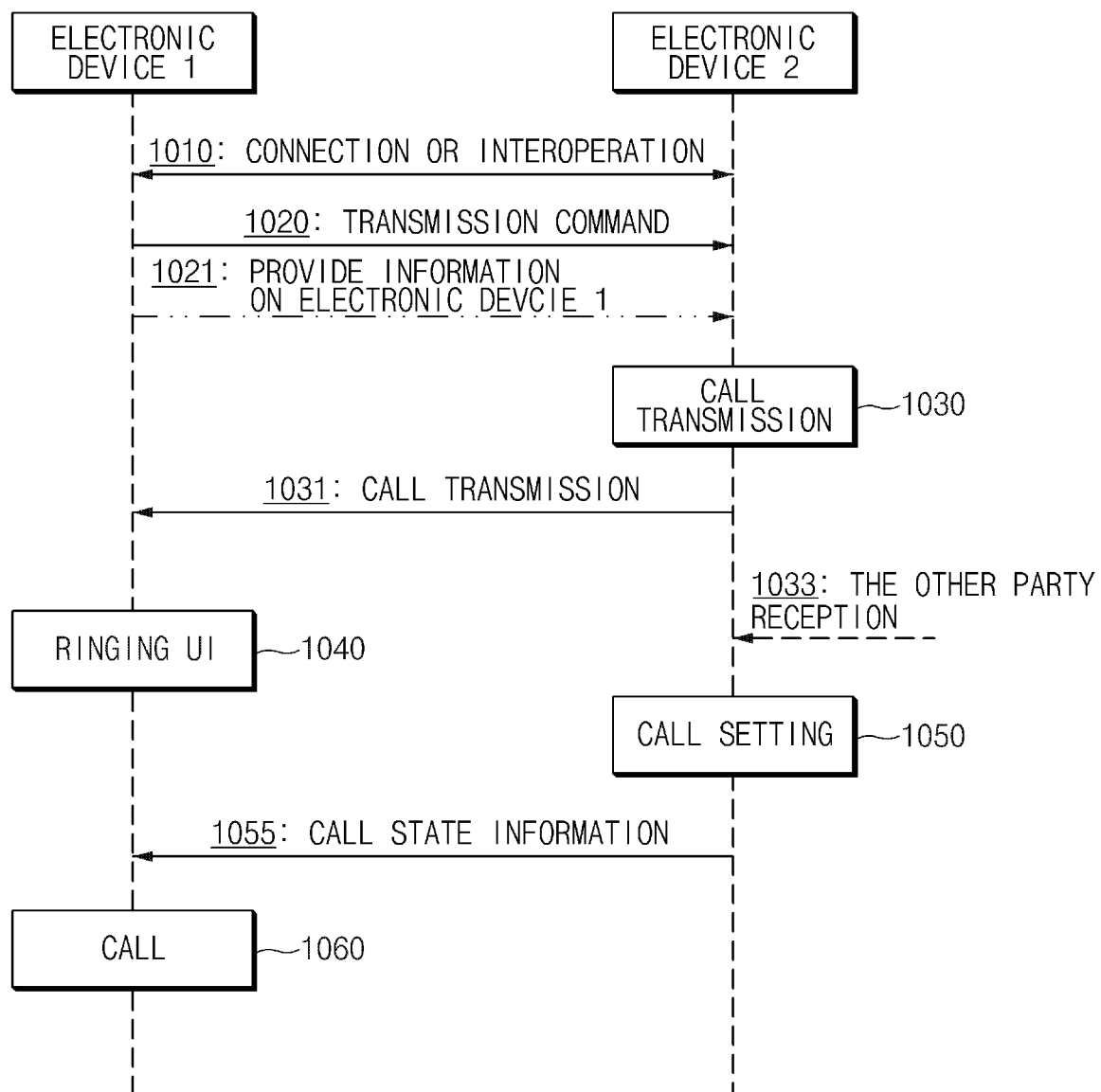
FIG. 10 illustrates a voice call process according to an embodiment of the present invention.

FIG. 10 illustrates a call process according to an embodiment of the present invention. According to an embodiment of the present invention, the call may include a voice call or a video call.

Referring to FIG. 10, the first electronic device and the second electronic device are in an interoperating state in operation 1010. During an interoperating process, information for using the first electronic device and the second electronic device is provided in advance. For example, while the first electronic device uses a data network, if another type of network is required, the first electronic device provides information for using a resource of the second electronic device.

In operation 1020, the first electronic device makes an outgoing call. According to an embodiment of the present invention, the first electronic device transmits a command for the outgoing call to the second electronic device in operation 1020.

In operation 1021, the first electronic device delivers outgoing source information (for example, the phone number of the first electronic device, the Universal SIM (USIM) information on the first electronic device, or identification information corresponding to a user account) to the second electronic device. The first electronic provides SIM information to the second electronic device. The operation may be performed selectively. For example, when the information is already exchanged, information on an outgoing source is shared via common user account information, or the first electronic device and the second electronic device have the same phone number (in this case, the SIMs are different, that is, at least two SIMs may be used for one phone number) during the interoperating process (operation 1010), operation 1021 may be omitted.

In operation 1030, the second electronic device transmits a call to another party's terminal. According to an embodiment of the present invention, the second electronic device transmits a call by using the phone number of its SIM. In this case, each of the first electronic device and the second electronic device has a SIM and a phone number.

In operation 1031, the second electronic device provides, to the first electronic device, call state information that the outgoing call is being transmitted.

In operation 1040, upon receipt of the call state information, the first electronic device displays a UI representing that the call is outgoing from the second electronic device. That is, a user using the first electronic device interoperating with the second electronic device transmits a call using another network (or a second network) while using an LTE data network, and recognizes the call as if the call that actually uses another network is being transmitted from the first electronic device, although the call is being transmitted using a communication resource of the second electronic device. According to an embodiment of the present invention, information that the call is transmitted using the second electronic device is provided on a screen of the first electronic device. According to an embodiment of the present invention, the screen includes a component where text, image, and video are displayed for users to see. A display module may refer to a module or a device (for example, an LED or an Active Matrix Organic LED (AMOLED) device) performing image processing to display the text, image, and video on the screen.

When the other party receives a call transmitted via the second electronic device, the second electronic device sets a call between the other party's terminal and the second electronic device in operation 1050. The changed call state information is provided to the first electronic device in operation 1055.

In operation 1060, upon receipt of state information that the call is connected to the other party's terminal, the first electronic device starts the call with the other party. The embodiment of the present invention illustrates that the call is performed in the first electronic device. For example, the first electronic device establishes a communication channel such as a BT voice channel with the second electronic device and delivers user voice data received via a microphone of the first electronic device to the second electronic device, and the second electronic device delivers voice data received from the other party (or the other party's terminal) to the user of the first electronic device via the same channel. Thus, the effect of talking directly with the other party via the first electronic device is achieved. However, according to an embodiment of the present invention, for example, a selection screen for selecting a call available device is provided to a UI in operation 1040 and according to a user's selection, a call is performed in the second electronic device. According to an embodiment of the present invention, when a short-range network such as BT is no longer formed, because the distance between the first electronic device and the second electronic device has increased, a user may continuously make a call using the first electronic device as an outgoing source via a microphone/speaker module of the second electronic device.

According to an embodiment of the present invention, when the first electronic device receives a call while using an LTE network, since a CSFB supporting network switches an LTE network into a 3G or a $2^{nd}$ Generation (2G) network, an LTE network may not be used. In this case, an application or the first electronic device using an LTE network may be affected in terms of performance. For example, when a call is received as downloading data via an LTE network, since an LTE network switches into a 3G network and the data is downloaded via a 3G network, download speed may be reduced.

According to an embodiment of the present invention, when a call is received as the first electronic device uses data via an LTE network, the received voice call is delivered to the second electronic device. Or, by setting in advance a call signal received by the first electronic device to be delivered to the second electronic device, when the first electronic device uses data via an LTE network, a call is received by the second electronic device instead of the first electronic device receiving the call. In this case, the first electronic device uses an LTE network continuously and the second electronic device starts a call that is an incoming call to the first electronic device via a 3G network.

The first electronic device delivers a call to the second electronic device via a call forwarding function using USSD or a call deflection function. Hereinafter, a call forwarding method using USSD is described with reference to FIG. 11 and call deflection is described with reference to FIG. 12.

FIG. 11 illustrates a process for forwarding a call received by a first electronic device to a second electronic device by using USSD, according to an embodiment of the present invention.

According to an embodiment of the present invention, the first electronic device delivers a message by using USSD to a network in advance in operation 1110. For example, when the first electronic device (or an application) operates under a network environment (for example, an LTE network), the first electronic device transmit USSD in advance to the network in preparation of the situation where the LTE network is interrupted in response to receiving an incoming call. For example, the first electronic device transmits a message in a format "*21*[phone number of second electronic device]#" to a network by using USSD. After the message is transmitted, a call using the first electronic device as a destination is forwarded to the phone number of second electronic device. If call forwarding is to be released, for example, the first electronic device or its application stops using the network environment, and a message terminating the call forwarding (for example, a message "##21#") is transmitted to the specified network. After the termination message is transmitted, a call received by the first electronic device is received directly by the first electronic device.

According to an embodiment of the present invention, the second electronic device receives call paging in operation 1120. Since the USSD is transmitted to a network (for example, a base station) in operation 1110, call paging received by the second electronic device in operation 1120 sets the first electronic device or the second electronic device as a destination.

In operation 1121, the second electronic device determines whether a received call is a call using the second electronic device as a destination based on the paging. If the received call is a call using the second electronic device as a destination, the process proceeds to operation 1123 to display a call reception UI on a screen of the second electronic device.

In operation 1121, if it is determined that the received call is not a call using the second electronic device as a destination, the second electronic device determines that the call uses the first electronic device as a destination. In operation 1125, the second electronic device provides call state information that a call is coming to the first electronic device. The call state information includes outgoing source (e.g., a caller) information.

In operation 1130, when the first electronic device receives call state information, it is determined that a call using the first electronic device as a destination is received and a UI representing that a call is incoming is provided to a screen. In this case, information representing that a corresponding call is received via the second electronic device (or a communication module of the second electronic device) is provided. When a user input for receiving a call is provided in operation 1140, the first electronic device provides a call reception command to the second electronic device in operation 1141. In operation 1150, the second electronic device receives a call using the first electronic device as a destination.

In operation 1160, the second electronic device sets up a call. That is, the second electronic device establishes a voice call between the other party's terminal and the first electronic device, which are connected via resources of the other party's terminal and the second electronic device. The second electronic device provides changed call state information to the first electronic device in operation 1161. In operation 1170, the first electronic device starts a call with the other party's terminal. The first electronic device, like the embodiment of the present invention shown in FIG. 8, makes a call with the other party by connecting a voice channel such as BT with the second electronic device.

According to an embodiment of the present invention, at least one of operations 1121, 1123, 1125, 1130, 1140, 1141, 1161, and 1170 may be omitted. For example, a user may make a call, where the first electronic device is an outgoing source (e.g., a caller device) using a microphone/speaker module of the second electronic device. In addition, a user may make a video call, where the first electronic device is an outgoing source (e.g., a caller device) using a camera module 291 of the second electronic device.

FIG. 12 illustrates a process for forwarding a call received by a first electronic device to a second electronic device by using call deflection according to an embodiment of the present invention. In relation to FIG. 12, contents overlapping or corresponding to the contents described with reference to FIG. 11 are omitted.

USSD supporting the call forwarding function described with reference to FIG. 11 must be provided in advance to a network before a call is received and when a call is received by an electronic device, call forwarding may not be performed using the method of FIG. 11. In this case, the call deflection method of FIG. 12 is used.

Referring to FIG. 12, the first electronic device receives paging for a call in operation 1210. The first electronic device is connected to an LTE network for data communication, and if there is a possibility of a disconnection of the connection to the LTE network by reception of an incoming call, a call for the first electronic device is received via the second electronic device.

In operation 1220, when an input occurs in the first electronic device (for example, "4+[phone number of second electronic device]+SEND") while a call is received, a reception call is forwarded to the phone number of second electronic device. Herein, the input may be performed automatically or manually according to a situation of the first electronic device.

Processes after operation 1230 (for example, operations 1230 to 1280) correspond to operations 1120 to 1170 of FIG. 11. According to an embodiment of the present invention, at least one of operations 1231, 1233, 1235, 1240, 1250, 1251, 1271, and 1280 may be omitted. For example, a user may make a call, where the first electronic device is an outgoing source (e.g., a caller device) using a microphone/speaker module of the second electronic device. In addition, a user may make a video call, where the first electronic device is an outgoing source (e.g., a caller device) using a camera module 291 of the second electronic device.

Although the second electronic device receives a call by using its modem, an actual call may be performed in the first electronic device by using a communication channel connected between the first electronic device and the second electronic device.

Figure 13:
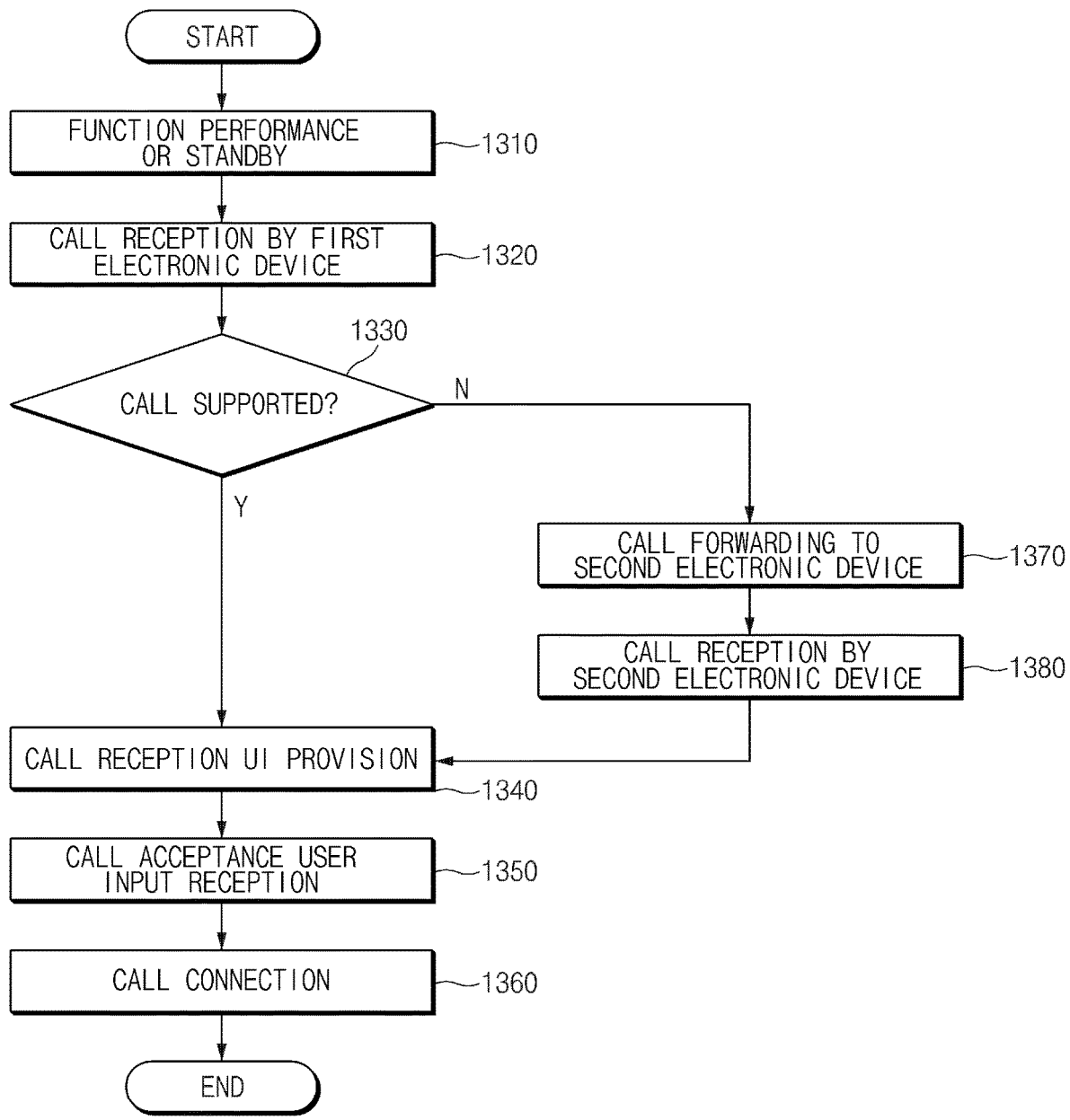
FIG. 13 illustrates a call forwarding or call deflection process depending on a call type support of an electronic device according to an embodiment of the present invention.

FIG. 13 illustrates a call forwarding or call deflection process depending on a call type support of an electronic device according to an embodiment of the present invention.

For example, when a user owns the first electronic device (for example, a smart watch) and the second electronic device (for example, a smartphone), the other party may attempt to call the user via at least one of the first electronic device and the second electronic device. According to an embodiment of the present invention, a call received from the other party may be a wideband voice call, which is commonly referred to as an HD voice call, supported by Voice over LTE (VoLTE). The other party may transmit an HD voice call to the first electronic device of the user.

According to an embodiment of the present invention, the HD voice call is supported by 2G and 3G networks or an LTE network, but if the first electronic device of the user supports only 2G and 3G networks, the user may not receive the HD voice call under an LTE network environment. In this case, the user may experience relative quality impairment. As such, when the first electronic device does not support all or some functions and the second electronic device interoperating with the first electronic device supports a function not supported by the first electronic device, the function not supported by the first electronic device is performed by the second electronic device.

Referring to FIG. 13, the first electronic device performs a function or is in a standby state in operation 1310. In operation 1320, the first electronic device receives a call. The call, for example, may be an HD voice call using VoLTE. In operation 1330, the first electronic device determines whether the first electronic device supports the call. If it is determined that the support is available, the process proceeds to operation 1340 and, if not, proceeds to operation 1370.

When it is determined that the first electronic device supports the incoming call, the first electronic device provides a UI for receiving the call to a screen in operation 1340. When an input for permitting the reception of the call is received from the user in operation 1350 (for example, selecting a call button), the call between the other party's terminal and the first electronic device is connected in operation 1360.

According to an embodiment of the present invention, when it is determined that the first electronic device does not support the call or supports the call with partially degraded quality in operation 1330, the first electronic device forwards or deflects the call to the second electronic device the supports the call. In relation to the call forwarding or the call deflection, at least one of the methods relating to FIG. 7, 11, or 12 may be performed.

In operation 1380, the second electronic device receives the call. For a call connection between the other party's terminal and the second electronic device, operations 1340 to 1360 may be performed in the second electronic device. By performing such operations, a user performs a function (for example, HD voice call reception) by using a device that yields the best performance from among the first electronic device and the second electronic device.

According to an embodiment of the present invention, a call forwarding or call deflection function may be activated by using the above-mentioned USSD. According to an embodiment of the present invention, in the case of VoLTE, call forwarding or call deflection may be performed by using a Communication DIVersion (CDIV) function supported by an IP Multimedia Subsystem (IMS).

For example, by using a Communication Forwarding Unconditional (CFU) function among CDIV functions, call forwarding may be provided from the first electronic device to the second electronic device. According to an embodiment of the present invention, in order to start a VoLTE available HD voice call, the other party's terminal transmits an invite message for the first electronic device to an IMS network. A Serving-CSCF (S-CSCF) of an IMS network transmits the invite message to an Application Server (AS). After the AS receives the invite message for the first electronic device, since the call forwarding from the first electronic device to the second electronic device is applied to the first electronic device, a CFU logic operates. Accordingly, the IMS network transmits the invite message to the second electronic device. The second electronic device receiving the invite message may proceed to make a VoLTE HD voice call with the other party by responding with a message that indicates a successful request, which is commonly referred to as a "200 OK" message.

According to an embodiment of the present invention, call deflection may be performed from the first electronic device to the second electronic device by using a Communication Deflection (CD) function. In order to start a VoLTE available HD voice call, a user terminal transmits an invite message for the first electronic device to an IMS network. The IMS network transmits the invite message to the first electronic device. The first electronic device may transmit a message "moved temporarily" to the IMS network by performing CD in an automatic or manual setting. An S-CSCF of an IMS network transmits the message "moved temporarily" to an AS. A CD logic is performed in the AS and the IMS network transmits the invite message to the second electronic device. The second electronic device receiving the invite message may proceed to make a VoLTE HD voice call with the other party by responding a "200 OK" message.

According to an embodiment of the present invention, the first electronic device or the second electronic device may be a mobile terminal, a vehicle supporting a modem function, or an electronic device for a vehicle (for example, a telematics). According to an embodiment of the present invention, the first electronic device or the second electronic device may be a device supporting a call and message transmission/reception function in a home or an area inside a home. According to an embodiment of the present invention, the first electronic device and the second electronic device may each be a device used in an M2M network.

Figure 14:
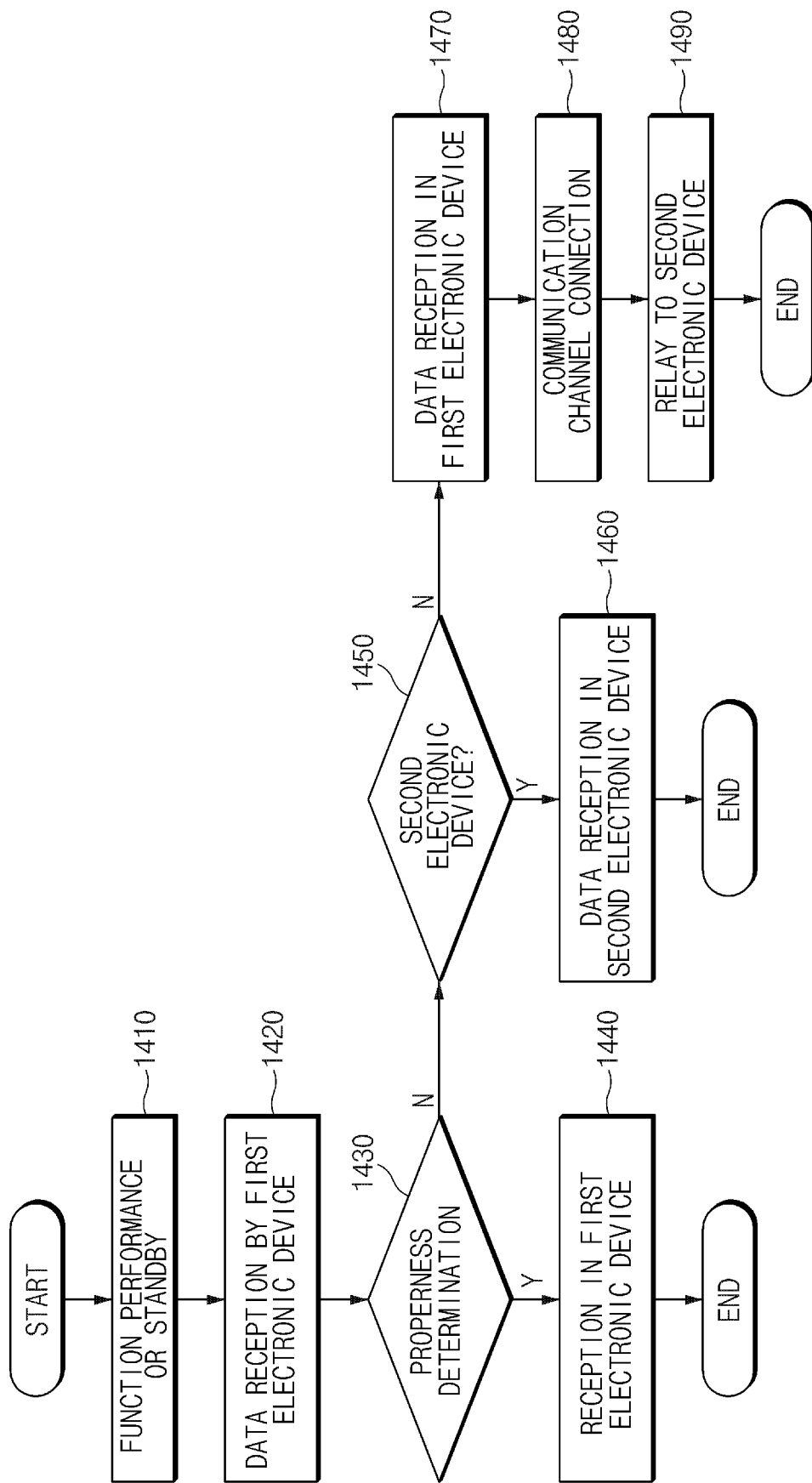
FIG. 14 illustrates a data reception process according to service or content characteristics according to an embodiment of the present invention.

FIG. 14 illustrates a data reception process according to service or content characteristics according to an embodiment of the present invention.

For convenience of description, FIG. 14 illustrates data reception, but a corresponding process may be applied to data transmission. According to an embodiment of the present invention, an electronic device transmitting/receiving data may be determined selectively according to services or content appropriate for characteristics of an electronic device.

For example, when an application of the second electronic device receives data, the first electronic device may receive corresponding data and may then deliver it to the second electronic device via a BT or a Wi-Fi connection. However, according to an embodiment of the present invention, corresponding data may be directly received by the second electronic device. Additionally, in the case of a service using content of a large size, such as a movie, the service may be received using a network of an electronic device (for example, the first electronic device) having greater memory capacity or greater processor and communication performance. And, in the case of a service using content of a small size, such as an instant message, the service may be received using a network of an electronic device (for example, the second electronic device) having less memory capacity or lower processor and communication performance. According to an embodiment of the present invention, in a situation where data load in the first electronic device is significant when using a Rich Communication Suite (RCS) (e.g., using VoLTE call and multimedia service at the same time), data used in the remaining application or service may be received by the second electronic device. According to an embodiment of the present invention, an electronic device may receive data by distinguishing appropriate data for a display of the electronic device. If data to be received is appropriate to be displayed on a screen of the second electronic device, the second electronic device may receive the data directly.

Referring to FIG. 14, the first electronic device performs a function or is in a standby state in is 1410. In operation 1420, data reception occurs in the first electronic device. In operation 1430, it is determined whether reception of the data by the first electronic device is appropriate. The appropriateness determination in operation 1430 may be performed based on various information, for example, the capacity or performance of the first electronic device, the current operation situation of the first electronic device, a connection situation with a network with which the first electronic device communicates, the data load of the first electronic device, and the resolution of content displayed on each electronic device. The appropriateness determination may be understood as including whether the received data is appropriate for the first electronic device as well as whether the data receiving situation is appropriate. For example, when the first electronic device receives an application (data or installation file (for example, a ".apk" file)) that is only executed in the second electronic device, even if it is appropriate for the first electronic device to receive the application in consideration of the size of the application, since the application is not appropriate for the first electronic device, the first electronic device may decide to provide the application to the second electronic device.

If it is determined in operation 1430 that the data is appropriate for the first electronic device, the process proceeds to operation 1440 and, if not, proceeds to operation 1450.

In operation 1440, the first electronic device receives the data. The received data may be displayed, installed, played, or used in various forms in the first electronic device.

In operation 1450, if it is determined that the data is not appropriate for the first electronic device, it is determined whether the second electronic device should receive the data. If it is determined that the second electronic device should receive the data (for example, when a significant data load occurs in the communication module of the first electronic device), the data is received by the second electronic device.

If it is determined in operation 1450 that the second electronic device should not receive the data, the process proceeds to operation 1470 and the first electronic device receives the data. In operation 1430, it was determined that the data is not appropriate for the first electronic device and, accordingly, the data is only received by the first electronic device and provided to the second electronic device. According to an embodiment of the present invention, a communication channel between the first electronic device and the second electronic device is connected in operation 1480 and data is relayed (or transmitted) to the second electronic device in operation 1490.

In addition to the above-mentioned embodiments of the present invention, other embodiments of the present invention are possible, where a function between the first electronic device and the second electronic device may be relayed, used selectively, or used simultaneously. Additionally, if there is a change in a function utilization environment while an operation is performed by using a function between electronic devices, a corresponding operation may be performed continuously in various forms.

According to an embodiment of the present invention, a call may be made with the other party's terminal via the second electronic device by using the modem of the first electronic device, and a communication channel may be connected between the first electronic device and the second electronic device. For example, a user may make a call with the other party's terminal while the communication module of the second electronic device is deactivated. In this case, although a call is connected using the communication module of the first electronic device, a user may obtain the same result as if the user made a call with the other party by using the second electronic device.

According to an embodiment of the present invention, a wearable device (for example, the first electronic device) such as a smart watch or glass is typically in a state of being worn, but a device (for example, the second electronic device) such as a smartphone, a tablet, and a laptop PC may be left in a bag or a jacket, or on a desk. In this case, a connection quality (for example, signal intensity or RSSI) between the first electronic device and the second electronic device may be monitored. According to an embodiment of the present invention, when the connection is released or the connection quality is less than a predetermined level, the first electronic device (or the second electronic device) may determine that the connection is unstable and may change a method of performing a function. For example, when it is determined that a call service provided from the first electronic device via the second electronic device (or the communication module of the second electronic device) becomes unstable, the second electronic device may proceed with a call forwarding process. For example, a process (operation 830 in FIG. 8) for determining whether a channel is connected may be replaced with a process for determining the connection quality of the channel. A call forwarding function may be activated by using USSD and, in the case of VoLTE, may use a CDIV function supported by an IMS. During a call, an ECT function may be used. These contents overlap the above contents and thus are omitted.

The above examples may be applicable to (voice) call service and data service. Data service may include video streaming via YouTube, music streaming via a music provider server such as Melody On (MelOn), and file download. For example, when the second electronic device receives data service of the first electronic device (for example, operation 1490 of FIG. 14), as a distance between the first electronic device and the second electronic device increases, the intensity of the signal may drop below a reference value or the connection may be released. While the first electronic device (or the second electronic device) monitors the sensitivity of the signal (for example, RSSI), when the sensitivity of the signal drops below a predetermined level, a data service forwarding process may proceed. For example, when the connection quality drops below a predetermined level, link Uniform Resource Locator (URL) or playback time information on a currently played file may be provided from the first electronic device to the second electronic device, and mutual synchronization may be performed. According to an embodiment, data service state information when the connection quality is less than a predetermined level or the connection is released may be recorded in user account information (for example, a Samsung account, a Google account, an Apple account, and so forth) and another terminal may perform data service continuously based on corresponding state information.

According to an embodiment of the present invention, an update of an application (or app) installed in an electronic device or app synchronization between electronic devices may be performed. When an app or data must be updated in an electronic device, each device may access a server to perform the update, or, alternatively, a representative device may access a server to perform the update and provide the received data to another device. The representative device may be set by a user or may be determined based on usage amount. Then, data may be provided via a communication channel such as BT. For example, as shown in the embodiment illustrated in FIG. 14, the representative device receives an app update or app sync data in operation 1470, connects a communication channel with an appropriate second electronic device in operation 1480, and shares the data in operation 1490. In this case, an appropriateness determination result may indicate a plurality of electronic devices appropriate for the received data to be applied, (although the received data is appropriate for the representative electronic device (for example, the first electronic device)) and may proceed to operation 1450 to provide the data to several devices.

According to an embodiment of the present invention, a main device (for example, a smartphone) receives update data of an application of an auxiliary device (for example, a wearable device) and may then deliver it to a wearable device via another communication means such as BT.

According to an embodiment of the present invention, if an application of a main device and an application (e.g. Counter App) of a wearable device are related and an application and a network periodically perform an app sync, one of the interoperating devices may perform synchronization as a representative and may share the synchronization data with the remaining devices.

Figure 15:
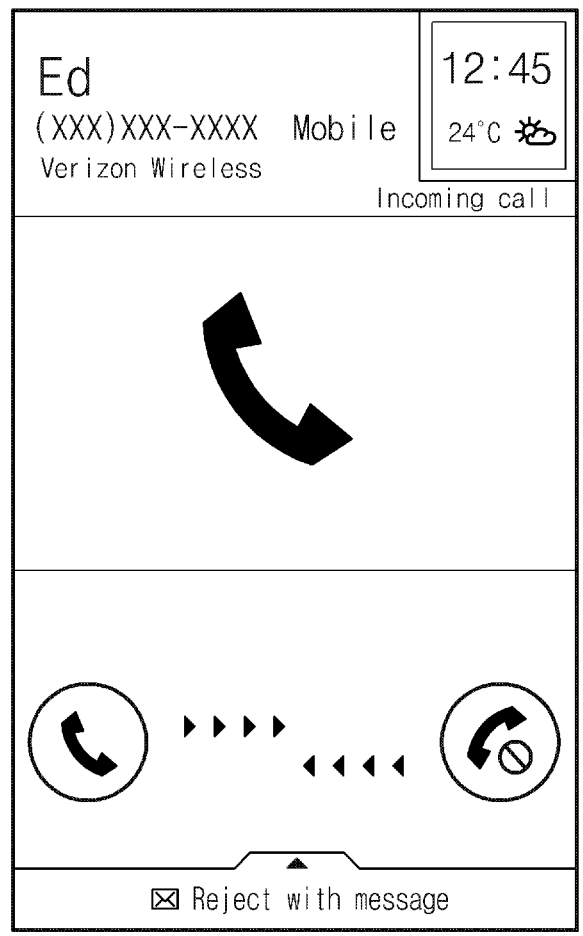
FIG. 15 illustrates a user interface screen according to an embodiment of the present invention.

FIG. 15 illustrates a user interface screen according to an embodiment of the present invention.

Referring to FIG. 15, when a function of the first electronic device is performed via the second electronic device, a display representing corresponding information may be provided to a screen of the first electronic device. For example, referring to the embodiment shown in FIG. 15, when a voice call is provided to a smartphone by using a communication module of a smart watch, a display that a corresponding call is received via the smart watch may be provided at the right top end in the screen of the smartphone.

However, according to an embodiment of the present invention, when a function of the first electronic device is performed using a resource of the second electronic device, a display representing this fact may not be provided. For example, when the battery of the first electronic device is less than a predetermined level, the first electronic device may receive a call by using the communication module of the second electronic device via the above-mentioned pairing or interoperating process and may save battery power by deactivating the communication module of the first electronic device. However, a user receiving a call via the first electronic device may not recognize that the call is transmitted/received via the second electronic device. Whether to display such information may be determined automatically or manually via a user setting.

An outgoing call forwarding method of the first electronic device in the second electronic device according to an embodiment of the present invention may include receiving an outgoing call command from the first electronic device, transmitting a call using the first electronic device as an outgoing source to the other party's terminal based on the outgoing call command, and providing call state information to allow the call between the other party's terminal and the first electronic device when the other party's terminal receives the call.

According to an embodiment of the present invention, the method may further include connecting a voice channel between the first electronic device and the second electronic device and, once a call is connected between the first electronic device and the other party's terminal, exchanging voice data between the first electronic device and the other party's terminal via the voice channel.

According to an embodiment of the present invention, the voice channel may be a BT channel.

A call forwarding method of the first electronic device according to an embodiment of the present invention may include receiving paging information in the first electronic device, determining whether the call is a call using the second electronic device as a destination based on the paging information, providing call state information to the second electronic device when the call is a call using the second electronic device as a destination, and receiving the call in the first electronic device when a reception command on the call is provided from the second electronic device and providing state information on the call to the second electronic device.

According to an embodiment of the present invention, the paging information may be received by the first electronic device via a USSD message provided to a network by the second electronic device.

According to an embodiment of the present invention, when the second electronic device uses a service in a network environment, the USSD message may be provided to the network.

According to an embodiment of the present invention, when the second electronic device terminates the use of the service, the USSD message releasing call forwarding may be provided to the network.

A resource utilization method of a plurality of electronic devices according to an embodiment of the present invention may include performing a function in the first electronic device, determining whether the first electronic device supports the function, and performing the function in the first electronic device or the second electronic device interoperating with the first electronic device based on the determination result.

According to an embodiment of the present invention, the method may include performing the function in the second electronic device supporting the function when all or a part of the function is not supported by the first electronic device.

According to an embodiment of the present invention, when the function is an HD voice call using VoLTE, the first electronic device does not support LTE communication, and the second electronic device supports LTE communication, the HD voice call may be performed in the second electronic device.

A data forwarding method of an electronic device according to an embodiment of the present invention may include receiving data in the first electronic device, determining the data, determining whether the data for the first electronic device is appropriate, and receiving the data in the first electronic device or providing the data to the second electronic device.

According to an embodiment of the present invention, providing the data to the second electronic device may include stopping reception of the data in the first electronic device and receiving the data from the second electronic device based on the appropriateness determination.

According to an embodiment of the present invention, providing data to the second electronic device may include receiving the data in the first electronic device, setting a communication connection between the first electronic device and the second electronic device, and providing the data from the first electronic device to the second electronic device via the communication connection.

According to an embodiment of the present invention, the first electronic device may be equipped with a first SIM (e.g. SIM1) and the second electronic device may be equipped with a second SIM (e.g. SIM2). Then, by using the first electronic device (for example, a main electronic device or a master device) and the second electronic device (for example, an auxiliary electronic device or a slave device), the usage efficiency of an electronic device may be improved during a call or message and data exchange. According to an embodiment of the present invention, a call may be used to refer to a circuit switching based voice call, a packet switching based voice call, a video call, packet data communication, and mutual communication available bi-directionally regardless of the communication bearer. According to an embodiment of the present invention, SIM may refer to a concept including all of a detachable SIM, an embedded SIM, a virtual SIM, and a software SIM. A method for recognizing a user of an electronic device may include MSISDN used as a general phone number in SIM/USIM/IP multimedia SIM (ISIM)/embedded SIM, Public User Identity or Private User Identity used in an IMS based service, a unique ID of an electronic device such as International Mobile station Equipment Identity (IMEI), an IP address allocated to a device on a network, or a separator with properties allowing bi-directional communication according to a user based account or a communication bearer used in an electronic device or an application.

Figure 16A:
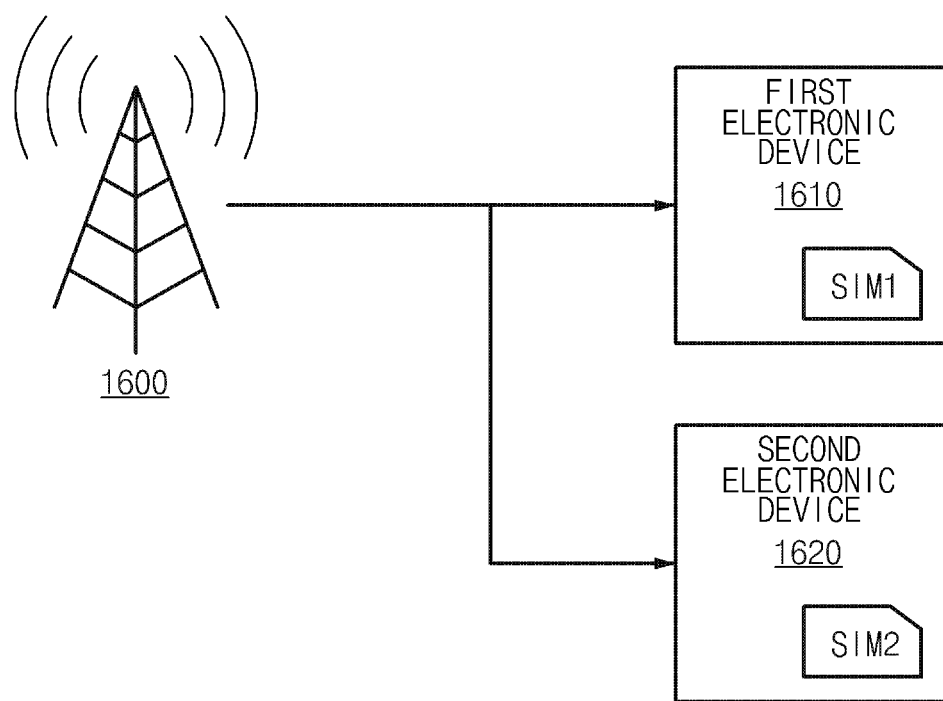
FIG. 16A illustrates a method of transmitting a signal to a first electronic device and a second electronic device by using identification information according to an embodiment of the present invention.
Figure 16B:
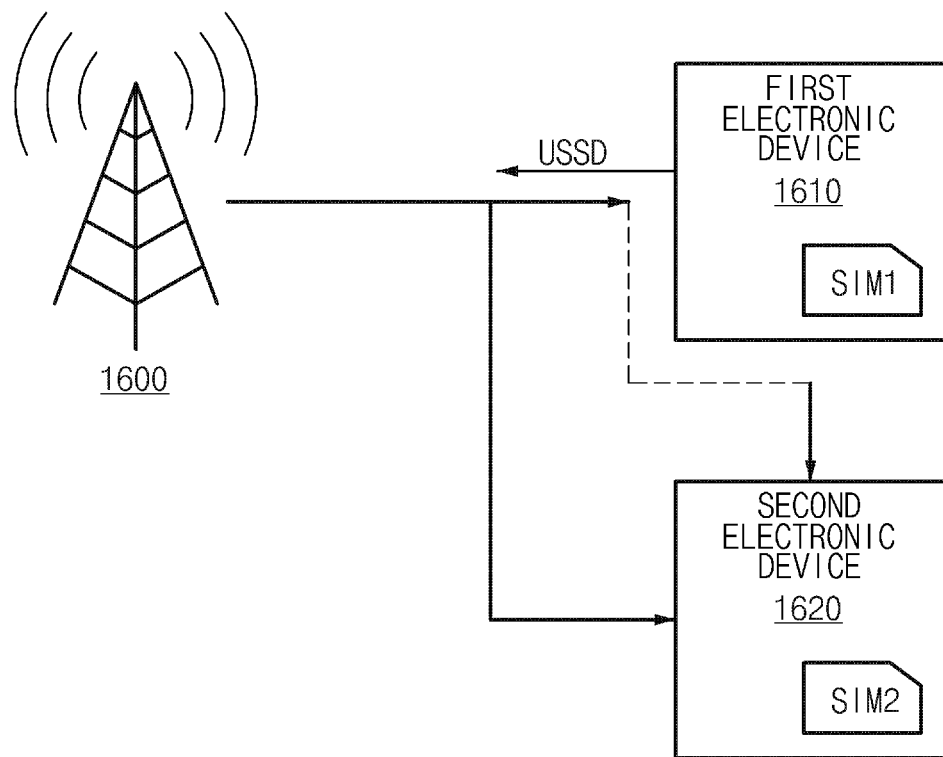
FIG. 16B illustrates a method of transmitting a signal on a first electronic device to a second electronic device by using identification information according to an embodiment of the present invention.

FIG. 16A illustrates a method of transmitting a signal to a first electronic device and a second electronic device by using identification information according to an embodiment of the present invention. Additionally, FIG. 16B illustrates a method of transmitting a signal on a first electronic device to a second electronic device by using identification information according to an embodiment of the present invention.

Referring to FIG. 16A, the first electronic device 1610 includes a SIM1 and the second electronic device 1620 may include a SIM2. A phone number (or numbers) corresponding to SIM1 and SIM2 may be set to the same or different phone number(s) according to an enhanced service that a communication carrier provides. An embodiment of the present invention in which different phone numbers are set according to the SIMs is shown in FIG. 16B.

When SIM1 and SIM2 have the same phone number, when a call is received from a base station (or a network), both the first electronic device 1610 and the second electronic device 1620 (or users of the first electronic device 1610 and the second electronic device 1620) receive a call signal. Similarly, both the first electronic device 1610 and the second electronic device 1620 receive an SMS or an instant message from another party's device. According to an embodiment of the present invention, a user may set a priority in advance on the first electronic device 1610 and the second electronic device 1620. In this case, according to a priority set by a user, a call signal and a message may be received sequentially in one electronic device or a plurality of electronic devices.

According to an embodiment of the present invention, in the case where SIM1 and SIM2 have different phone numbers, when a call is received from a base station (or a network), a user may set to receive a call to a phone number of the first electronic device 1610 at a significant distance from the user or as a call to a phone number of the second electronic device 1620 (for example, a wearable device such as a smart watch) nearer to the user. For example, delivering a signal received by the first electronic device 1610 (SIM1) to the second electronic device 1620 (SIM2) may be requested in advance via an enhanced service function such as call forwarding via a network carrier or a corresponding service provider server. When call forwarding is performed by using USSD in a base station (or a network), even when no direct information on the call forwarding is delivered between the first electronic device and the second electronic device, the call forwarding may be possible. The request, for example, may be the above-mentioned USSD message. As shown in FIG. 16B, when call forwarding is requested via USSD in the first electronic device 1610, a signal on the first electronic device 1610 is provided to the second electronic device. For example, the second electronic device 1620 receives a call signal for a call of SIM1 and/or SIM2, an SMS, an instant message, and so forth.

The embodiment of the present invention shown in FIGS. 16A and 16B may be applied to an IP based call reception scenario of an electronic device or a user account based call reception scenario of an electronic device, which are described below. In the application, an appropriate modification (for example, SIM1 and SIM may be changed to IP addresses IP #1 and IP #2) may be made.

According to an embodiment of the present invention, in the case of a call reception scenario, an IP based call method of an electronic device in addition to a phone number based call method may be possible. For example, it is assumed that an IP address of the first electronic device 1610 is IP #1 and an IP address of the second electronic device 1620 is IP #2, and a network carrier or a service provider server may call the IP addresses.

According to an embodiment of the present invention, a network carrier or a corresponding service provider server may bind the addresses of IP #1 and IP #2 as a device for one user and may manage it as IP # A. When the other party (for example, the other party's terminal) transmits a call to a user's electronic device (for example, the first electronic device 1610 and/or the second electronic device 1620) by using IP # A, a network carrier or a corresponding service provider server transmits a call signal to both the first electronic device 1610 and the second electronic device 1620 using the addresses IP #1 and IP #2 managed as IP # A. In this case, according to a priority set by a user, a call signal and a message may be received sequentially in one electronic device or in a plurality of electronic devices.

According to an embodiment of the present invention, a network carrier or a corresponding service provider server may set the addresses IP #1 and IP #2 as the IP address of an additional device for one user to allow another user to make a call.

According to an embodiment of the present invention, a user may set a call for the first electronic device 1610, which is at a significant distance from the user, to be received by the second electronic device 1620 (for example, a wearable device such as a smart watch), which is closer to the user. During this process, a method such as call forwarding or IP routing may be used. Then, a signal for the first electronic device 1610 is provided to the second electronic device 1620. For example, the second electronic device 1620 may receive a call signal for a call, an SMS, and an instant message being directed to the first electronic device 1610.

According to an embodiment of the present invention, in the case of a call reception scenario, a user account based call method may be possible. For example, it is assumed that a user account address inputted and used in the first electronic device 1610 is ID #1 and a user account address inputted and used in the second electronic device 1620 is ID #2. The addresses are called for a call by a network carrier or a corresponding service provider server.

According to an embodiment of the present invention, a network carrier or a corresponding service provider server may bind the addresses ID #1 and ID #2 as an account for one user and may manage it as ID # A. When the other party (for example, the other party's terminal) transmits a call to a user's electronic device, for example, the first electronic device 1610 and/or the second electronic device 1620, by using ID # A, a network carrier or a corresponding service provider server transmits a call signal to both the first electronic device 1610 and the second electronic device 1620 using the accounts ID #1 and ID #2 managed as ID # A. In this case, according to a priority set by a user, a call signal and a message may be received sequentially in one electronic device or in a plurality of electronic devices.

According to an embodiment of the present invention, a network carrier or a corresponding service provider server may set the user account addresses ID #1 and ID #2 as an additional user account address representing the ID of a device that a user uses to allow another user to make a call.

According to an embodiment of the present invention, a user may set a call to the first electronic device 1610 using the user account of ID #1, which is at a significant distance from the user, to be received by the second electronic device 1620, which is closer to the user, using the user account of ID #2. During this process, a method such as call forwarding or routing for delivering a call signal and a message for the user account ID #1 to the user account ID #2 via a network carrier or a corresponding service provider server may be used. For example, the second electronic device 1620 using the user account ID #2 may receive a call signal for a call, a SMS, and an instant message for the first electronic device using the user account ID #1.

According to an embodiment of the present invention, a user account address inputted and used in the first electronic device 1610 and a user account address inputted and used in the second electronic device 1620, which may be called by a network carrier or a corresponding service provider server for a call or signal transmission, may be the same as ID #1. When the other party transmits a call to a user by using ID #1, the call may be delivered to the first electronic device 1610 and the second electronic device 1620 currently using a corresponding account.

In addition to the above-mentioned embodiments of the present invention, as a separator or identification information used for a call in the first electronic device 1610 and second electronic device 1620, an identifier identifying the first electronic device 1610 and the second electronic device 1620, or an external recognition module inserted into the first electronic device 1610 and the second electronic device 1620 in hardware form to provide service, or a code set by a user or automatically stored in a device in software form to provide service, an address value used statically or dynamically by being allocated from a network, or a separator inputted by a user and stored in a device to be used in order for a service may be used. When such a separator is used, the method may be appropriately modified and applied.

A method of transmitting/receiving a communication signal in an electronic device according to an embodiment of the present invention may include transmitting a signal to at least one electronic device corresponding to identification information. The signal may be received by some of the at least one electronic device according to a predetermined standard.

According to an embodiment of the present invention, the signal may include a voice call signal or a message signal.

According to an embodiment of the present invention, the identification information includes a phone number. The signal may be received according to a priority set in advance in the at least one electronic device corresponding to the phone number.

According to an embodiment of the present invention, the priority may be set by a user input.

According to an embodiment of the present invention, transmitting the signal may include, when there is a forward request from the at least one electronic device to another electronic device, transmitting the signal for the at least one electronic device to the other electronic device.

According to an embodiment of the present invention, the identification information includes IP information. The IP information includes at least one IP address. The signal may be received according to a priority set in advance in the at least one electronic device corresponding to the at least one IP address.

According to an embodiment of the present invention, the identification information includes user account information. The user account information includes at least one piece of ID information. The signal may be received according to a priority set in advance in the at least one electronic device corresponding to the at least one piece of ID information.

According to an embodiment of the present invention, phone numbers corresponding to SIM1 and SIM2 may be serviced by setting one phone number or different phone numbers according to an enhanced service that a communication carrier provides. In the case where SIM1 and SIM2 have the same phone number, when a call is transmitted, a user may transmit a call signal for a call, an SMS, and an instant message by using one of the first electronic device and the second electronic device. When a user transmits a call or a message via the first electronic device or the second electronic device, the other party recognizes the user via the user's phone number.

According to an embodiment of the present invention, in the case where SIM1 and SIM2 have different phone numbers, when a call is transmitted, although a user wants to make a call using the phone number of the first electronic device equipped with SIM1, only the second electronic device equipped with SIM2 is available. In such a case, a method where the first electronic device relays a call to the second electronic device and connects to the other party's terminal is shown in FIGS. 17A and 17B.

Figure 17A:
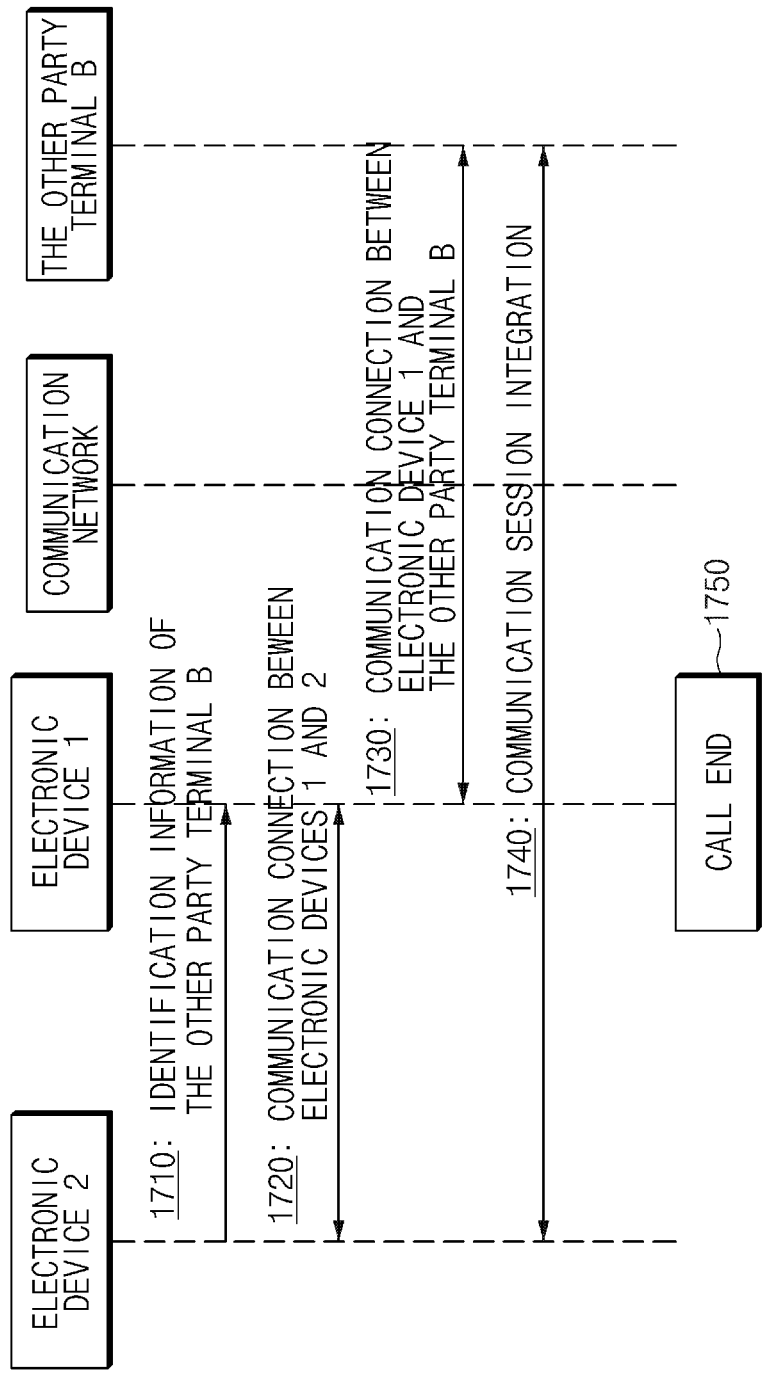
FIG. 17A illustrates relaying a call of a second electronic device in a first electronic device according to an embodiment of the present invention.
Figure 17B:
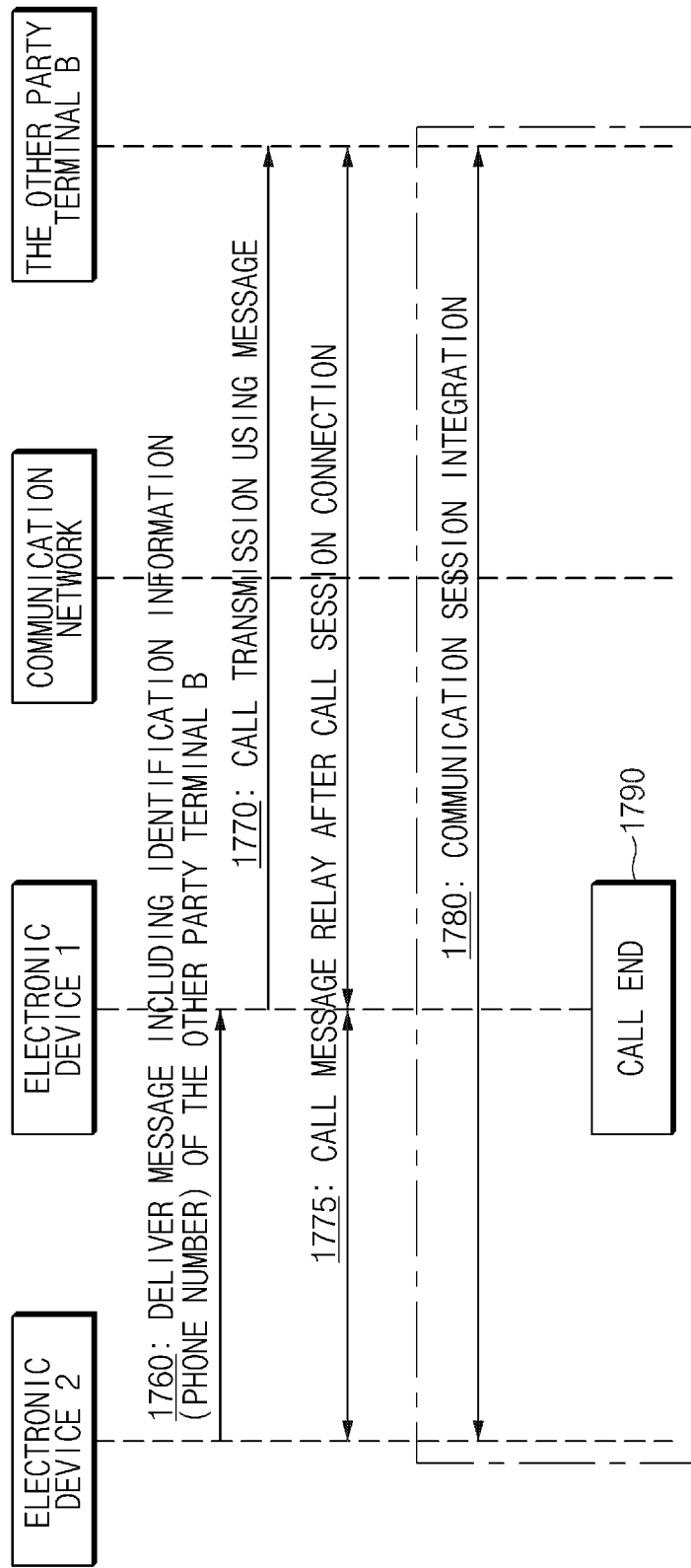
FIG. 17B illustrates relaying a call of a second electronic device in a first electronic device according to an embodiment of the present invention.

FIG. 17A illustrates relaying a call of a second electronic device in a first electronic device according to an embodiment of the present invention.

Referring to FIG. 17A, both the first electronic device and the second electronic device (for example, electronic device 1 and electronic device 2) are a user's devices. The other party terminal B may be a device of the other party.

According to an embodiment of the present invention, when a user selects a call transmission via a UI for selecting SIM1 as a transmission number in the second electronic device equipped with SIM2, the second electronic device transmits a message including the identification information on the other party terminal B in operation 1710. The corresponding message is received in the first electronic device. The second electronic device and the first electronic device are the same user's devices and may share mutual information (for example, phone numbers, device information, and SIM information). Accordingly, when the second electronic device connects a call to the first electronic device (for example, operation 1720) by using the phone number (for example, the phone number of SIM1) of the first electronic device, the call is connected after the phone number of the other party terminal B is transmitted via a message such as an SMS or an instant message. Once the call is connected, a communication session between the first electronic device and the second electronic device is generated.

In operation 1730, the first electronic device transmits a call to the other party terminal B by using a conference call or a multi-party call provided by a communication carrier by using the received phone number of SIM2. In operation 1740, the first electronic device connects two call sessions (the first electronic device to the second electronic device and the first electronic device to the other party terminal B) and then integrates them as one session. Then, in operation 1750, the call of the first electronic device is terminated and a call session between the second electronic device and the other party terminal B is maintained continuously.

FIG. 17B illustrates relaying a call of a second electronic device in a first electronic device according to an embodiment of the present invention.

According to an embodiment of the present invention, in a method where the second electronic device makes a call with the other party terminal B via the first electronic device, the second electronic device regards the first electronic device as a modem for transmitting a call to the other party terminal B. For example, in operation 1760, the second electronic device loads a message including the other part's identification information (for example, a phone number) for allowing the second electronic device to make a call with the other party terminal B into packet data and then delivers it to the first electronic device. The message may correspond to a formal message format received by a modem included in an electronic device when the electronic device transmits a call.

In operation 1770, the first electronic device changes the transmission (phone) number of SIM1 by using the received message format in the first electronic device and makes a call to the other party terminal B via the modem of the first electronic device. In this case, the other party recognizes a call sender (e.g. a user) via the SIM1 number. According to an embodiment of the present invention, in operation 1775, the first electronic device serves as the modem of the second electronic device and generates a call session with the other party terminal B to relay a call message between the second electronic device, the first electronic device, and the other party terminal B. In this case, a communication method between the second electronic device and the first electronic device may include a short-range communication such as Wi-Fi, Bluetooth, Zigbee, or a communication using a cellular network.

According to an embodiment of the present invention, in operation 1780, the second electronic device connects and binds two call sessions as one session by using a function such as conference call or multi-party all provided from a carrier and then, in operation 1790, the first electronic device terminates the call to connect a call session between the second electronic device and the other party terminal B. Operations 1780 or 1790 may be performed selectively.

According to an embodiment of the present invention, in the case where a call is made or a call is relayed, a subject generating an actual call may be checked. According to an embodiment of the present invention, when it is assumed that a user having the first electronic device and the second electronic device transmits a call to the other party, a user's main device uses the SIM1 phone number and a user's auxiliary device uses the SIM2 phone number. According to an embodiment of the present invention, in general, when a call is made in the main device, the SIM1 phone number is displayed to a receiver, and when a call is made in the auxiliary device, the SIM2 phone number is displayed to a receiver. If a representative phone number display function is activated, a sender may select a representative phone number and may transmit a call when the call is transmitted from a main device or an auxiliary device. Or, the representative phone number may be set by a user in advance. In this case, when a call is made from a main device or an auxiliary device, a predetermined representative phone number may be transmitted as a sender's phone number.

According to an embodiment of the present invention, when a user uses the SIM1 phone number as a representative phone number and transmits a call to the other party by using an auxiliary device, the transmission call is performed using SIM2. The other party receives a phone number corresponding to SIM2 and performs a call in a call network exchange based call session. Herein, the call may refer to before a user's phone number is displayed on a screen of the other party's terminal. While a user starts a CS call with the other party by using SIM2, SIM1 information may be delivered to the other party by using an SMS or packet data. The other party's terminal may process the SIM1 phone number to be displayed on a screen in consideration that the current reception call is received using the SIM2 phone number by receiving the SMS or packet data. The above-mentioned operation may be performed in an application relating to a call. Additionally, this operation may be performed at a framework stage.

According to an embodiment of the present invention, SIM information may be transmitted using an SMS. For example, the first electronic device and the second electronic device may use SIM1 and SIM2, respectively, and may be connected. According to an embodiment of the present invention, when a user transmits a call to SIM2 (for example, the second electronic device), an application of the first electronic device or the second electronic device may recognize the corresponding fact. According to an embodiment of the present invention, the second electronic device transmits an originating call to a network by using SIM2. The other party terminal may receive a paging message for this and may then provide a response (for example, a paging response).

Since the paging message is delivered from SIM2, it is recognized in the modem of the other party's modem that the call starts from SIM2. A user's terminal (for example, the second electronic device) may transmit data indicating that the currently starting call must be displayed as the SIM1 phone number via an SMS as soon as starting an originating call. The other party's terminal may recognize that a call starting from SIM2 recognized by the modem of the other party's terminal must be displayed as the SIM1 phone number based on this SMS message information and may then display the SIM1 phone number on a screen of the other party's terminal. In this case, the SMS received by the other party's terminal may be processed internally and its content or reception notification may not be provided to a user. According to an embodiment of the present invention, when an originating call proceeds with a representative number set by a user, an operation for transmitting the SMS may be omitted.

According to an embodiment of the present invention, SIM information may be transmitted using Packet Switched (PS) data. According to an embodiment of the present invention, a user's phone application may recognize that a user transmits a call to SIM2. In this case, a user's terminal (for example, the second electronic device) transmits an originating call to a network by using SIM2. The other party's terminal may receive a paging message for this and may then provide a response (for example, a paging response).

Since the paging message is delivered from SIM2, it is recognized in the modem of the other party's modem that the call starts from SIM2. A user's terminal (for example, the second electronic device) may transmit data indicating that the currently starting call must be displayed with the SIM1 phone number via PS data as soon as starting an originating call. This data may be delivered to the other party's terminal via a server. According to an embodiment of the present invention, the server may be a server managing a phone application. According to an embodiment of the present invention, the server may be a Simple Traversal of User datagram protocol through Network address translation (STUN) server. The other party's terminal may recognize that a call starting from SIM2 recognized by the modem of the other party's terminal must be displayed as the SIM1 phone number based on packet data received from a server and may then display the SIM1 phone number on a screen of the other party's terminal.

According to an embodiment of the present invention, one of the sender's SIM1 and SIM2 phone numbers may be selected as a representative number and displayed. When it is assumed that a user having a main device and an auxiliary device transmits a call to the other party, a user's main device uses the SIM1 phone number and a user's auxiliary device uses the SIM2 phone number. According to an embodiment of the present invention, in general, when a call is made in the main device, the SIM1 phone number is displayed to a received, and when a call is made in the auxiliary device, the SIM2 phone number is displayed to a receiver. If a representative phone number display function is activated, a sender may select a representative phone number and may transmit a call when the call is transmitted from a main device or an auxiliary device. Or, the representative phone number may be set by a user in advance. In this case, when a call is made from a main device or an auxiliary device, a predetermined representative phone number may be transmitted as a sender's phone number.

According to an embodiment of the present invention, the representative phone number may be stored in the other party's contact list. Only the SIM phone number may be registered in the other party's contact list. When a user makes a call to a main device, a CS call session proceeds by using SIM1 and may transmit SIM2 information as an SMS or PS data. Since the SIM1 phone number is registered, the other party ignores the SIM information received from the SMS or PS data and may display the SIM1 phone number on a screen. In an embodiment of the present invention, when a user makes a call to an auxiliary device, a CS call session proceeds by using SIM2 and may transmit SIM1 information as an SMS or PS data. Since the SIM1 phone number is registered, the other party may not know about a sender of the SIM2 phone number received via a CS session. However, if the SIM1 information received as an SMS or PS data is processed, it is recognized that the SIM1 and SIM2 are the same user. Thus, even when a call is received with the SIM2 phone number at the modem terminal, SIM1 stored in the contact list (e.g. phone book) may be displayed on the screen of the other party's terminal. The operation may be performed in an application relating to a call. Additionally, the operation may be performed at a framework stage.

According to an embodiment of the present invention, an electronic device uses each phone number using SIM1 and SIM2, but may manage them as one user account and use it. For example, when one user uses a main device and an auxiliary device by using one account, devices corresponding to the SIM1 and SIM2 phone numbers transmit/receive a voice call or an SMS by using the user account. That is, a voice call or an SMS is transmitted via a main device or an auxiliary device, the SIM1 or SIM2 phone numbers are used in a CS network, but at the same time, data representing that a voice call or an SMS is transmitted from a corresponding user account is transmitted to a server via a PS network. At the reception side, a notification that a voice call or an SMS is incoming from a corresponding user account may be displayed on a screen. In this case, a representative number may be replaced with user identification information (for example, name, ID, and so forth) included in a corresponding user account and may be displayed.

According to an embodiment of the present invention, when a device including a SIM is mapped into a user account or a SIM ID/phone number and interoperates, an event between devices may be shared. The event may be a state between devices (for example, a battery, a modem, a network, sensor information, and so forth) or notification information. For example, when there is a plurality of electronic devices managed by one user account, when a battery power state is less than a predetermined level in one electronic device, corresponding information may be provided to the other electronic devices. Information for saving battery power in addition to the provision of the information, for example, information on a deactivation available module in a corresponding device and other devices capable of replacing a function of the module when the module is deactivated, may be provided together.

According to an embodiment of the present invention, when a user owns a plurality of electronic devices and all of the devices have SIMs, under a situation where the electronic devices are disposed at different locations and the transmission of a notification on the reception of a call or text is unavailable via a short-range communication (for example, BT), if text or a call is received in one device, a method of transmitting information on this to another device may be required.

According to an embodiment of the present invention, a call or text may be received by the first electronic device using SIM1. The received information may be retransmitted to the second electronic device using SIM2 via packet switched data. When a notification on the information is provided to the screen of the second electronic device, the second electronic device performs an additional operation such as replying to a call or text based on a user's input.

According to an embodiment of the present invention, information may be received by the first electronic device using SIM1 or an event may occur. The first electronic device may transmit the received information to a cloud server. A user may register a plurality of electronic devices in one account and the account may be registered in the cloud server. The cloud server may share the information event with a plurality of devices corresponding to the user account. Additionally, a period for performing a synchronization operation with other devices using the same user account may be changed, or the fact that there is update information may be provided to other devices.

According to an embodiment of the present invention, when a call is attempted to a user, if the call is attempted with a representative number, the call is attempted with a first phone number among a plurality of phone numbers included in a representative number. If a terminal corresponding to the first phone number among a plurality of terminals that a user owns is OFF, a response that a corresponding terminal is OFF may be provided from a network. Once the response is received, an electronic device may attempt to make a call with a second phone number included in the representative number. An electronic device corresponding to the first phone number, the second phone number, or each phone number may be registered in one user account and managed.

According to an embodiment of the present invention, when an operation for attempting to make a call with the second phone number different from the first phone number is performed, a screen when an operation for attempting to make a call with the first phone number is performed may be continuously displayed on the screen of the electronic device. That is, a user sending a call may not recognize the fact that an electronic device attempts to make a call with another user while changing a phone number.

Figure 18A:
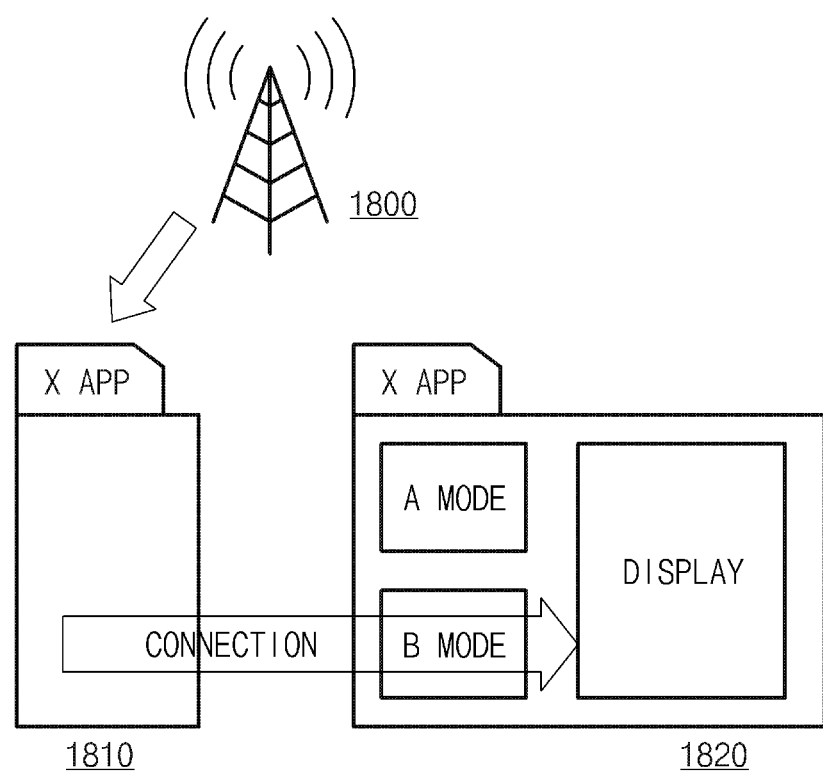
FIGS. 18A and 18B illustrate a mode changing method when a connection between electronic devices is disconnected according to an embodiment of the present invention.
Figure 18B:
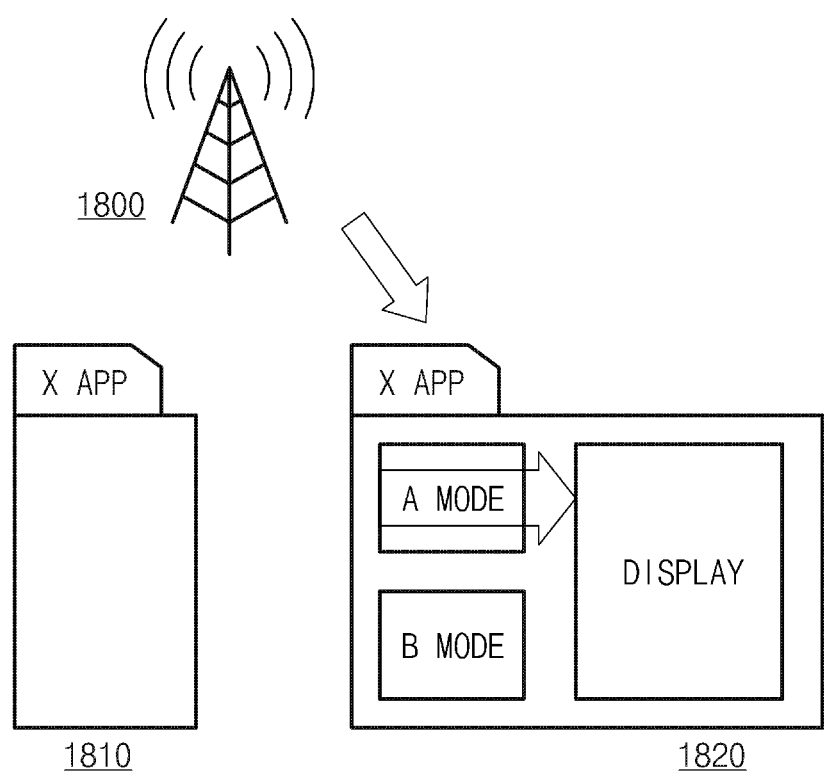

FIGS. 18A and 18B illustrate a mode changing method when a connection between electronic devices is disconnected according to an embodiment of the present invention.

Before describing the method in relation to FIGS. 18A and 18B, embodiments of the present invention, in which when a first electronic device and a second electronic device are connected to each other, the connection is disconnected, are described.

According to an embodiment of the present invention, each of the first electronic device and the second electronic device has user information and may be communicable with a base station. According to an embodiment of the present invention, each of the first electronic device and the second electronic device may have the same or a different phone number. That is, according to the circumstances, they may have different phone numbers or the same phone number.

According to an embodiment of the present invention, when each of the first electronic device and the second electronic device has an additional phone number, a user may have two numbers AAA-AAAA and BBB-BBBB. In the case that a user connects and uses the first electronic device and the second electronic device, when data is received by the two phone numbers, it is information for one user. The same method for receiving data may be used for processing.

According to an embodiment of the present invention, while the first electronic device and the second electronic device are connected, an operation where a user wants to use only the second electronic device instead of the first electronic device may be determined. The operation may be determined by a sensor unit of the second electronic device. For example, while connected, when movement of the second electronic device is detected and then the connection is disconnected, the first electronic device may determine that a user moves to use only the second electronic device. Then, while connected, the second electronic device may deliver its movement information to the first electronic device. In this case, when one of movement detection or disconnection occurs, the second electronic device may recognize that a user wants to use a function of the second electronic device.

Each electronic device may have a unique number (for example, SIM number or phone number). Once disconnected, a user may receive a call with a unique number by using each electronic device. In order to prevent this, when movement of a user's electronic device is detected and then the connection is disconnected as mentioned above, the device that moved is determined as a portable device and the first electronic device may request switching a call reception with the number AAA-AAAA to a call reception with BBB-BBBB from a base station. For example, USSD may be delivered to a base station when movement is detected in an electronic device or wearing is detected (for example, in the case of a smart watch), or according to a predetermined priority. Then, the first electronic device may set a corresponding call reception connection and then may cut off a function of a corresponding communication unit. Additionally, a mode of an application installed in the second electronic device may be change.

According to an embodiment of the present invention, in a situation where each of the first electronic device and the second electronic device has one phone number and each device functions alone, when the first electronic device and the second device have one phone number (XXX-XXXX-XXXX) in a base station and a signal XXX-XXXX-XXXXA or XXX-XXXX-XXXXB is from a device, the base station may forward a call signal to a corresponding device (e.g. not turn on simultaneously).

According to an embodiment of the present invention, by distinguishing a pairing state between the first electronic device and the second electronic device, a scenario for delivering phone number information may be assumed. For example, it is assumed that step 1 is a state in which pairing is in a strong electric field, step 2 is a state between a strong electric field and a weak electric field, and step 3 is a state in a weak electric field. When the first electronic device and the second electronic device have pairing in step 1, they share information for call reception. Then, in the case of pairing in step 2, each device sets a priority on each number for each device and monitors whether step 2 switches to step 1 or step 3. Then, during pairing in step 3, phone number information with a priority stored in each device is deleted after a predetermined time. The pairing in step 3 may be in a pairing disconnected state.

According to an embodiment of the present invention, in relation to a data priority account instead of call reception, when the first electronic device and the second electronic device are paired and operate separately, a user must receive the notification via a device currently in use. When an application having the same account information as the first electronic device and the second electronic device is used, as the first electronic device and the second electronic device are paired or operate separately, a data processing method of a corresponding application may vary.

Again, referring to FIGS. 18A and 18B, each of the first electronic device 1810 and the second electronic device 1820 may install a specified application (for example, an app X) and each app may share the same user account.

Referring to FIG. 18A, when the first electronic device 1810 and the second electronic device 1820 are paired, the second electronic device 1820 receives and processes an event that the first electronic device 1810 receives from a base station or wireless network. Then, an X application installed in the second electronic device 1820 operates in a B mode for receiving information from the X application of the first electronic device 1810.

Referring to FIG. 18B, it is shown that a mode change of the X application occurs when the first electronic device 1810 and the second electronic device 1820 operate independently. FIG. 18B illustrates that the X application operates in the second electronic device when the first electronic device and the second electronic device are paired. FIG. 18B illustrates that the first electronic device changes a mode of the X application in the second electronic device when the first electronic device and the second electronic device are disconnected (for example, a distance between the first electronic device 1810 and the second electronic device 1820 is increased or they are disconnected). Whether to change a mode may be determined based on a pairing signal and when pairing is disconnected and then call forwarding is set to a base station, a mode change command may be delivered to a corresponding server of the X application. During a mode change, the second electronic device receives information on the X application alone and operates in an independent mode of the X application. Then, as the X application of the second electronic device changes into A mode, the electronic device 1820 processes an event received from a base station or a wireless network and provides it to a user.

The SIM included in interoperating devices may support call/data service or may support data service but not call service. An International Mobile Station Identity (IMSI) and Mobile Station international ISDN (MSISDN) number may be allocated to the SIM supporting a call. A SIM supporting a call or a SIM not supporting a call may exchange an MSISDN and may then switch call service. According to an embodiment of the present invention, when a device including a SIM supporting a call cannot use a modem, it may deliver an MSISDN and information relating thereto to a device using a device and may then handover call service.

According to an embodiment of the present invention, a method of relaying a communication signal in the first electronic device may include receiving a message including identification information on the other party's terminal from the second electronic device, connecting a first communication session with the second electronic device, connecting a second communication session with the other party's terminal by using the identification information, generating a new communication session between the second electronic device and the other party's terminal based on the first communication session and the second communication session, and terminating the first communication session and the second communication session.

According to an embodiment of the present invention, connecting the other party's terminal and the second communication session may be performed by conference call or multi-party call provided from communication carriers.

According to an embodiment of the present invention, a method of relaying a communication signal in the first electronic device may include receiving a message used for call transmission from the second electronic device, transmitting the call to the other party's terminal based on the message, generating a communication session between the second electronic device and the other party's terminal, and terminating a call of the first electronic device.

According to an embodiment of the present invention, the call transmission may transmit a transmission number as identification information on the second electronic device while maintaining the format of the received message.

According to an embodiment of the present invention, the format of the message may correspond to the format of a message used for call transmission from a modem of the first electronic device.

According to an embodiment of the present invention, a method of attempting a call in an electronic device may include attempting a call with a first phone number and attempting a call with a second phone number that is different from the first phone number in response to when an electronic device corresponding to the first phone number is OFF.

According to an embodiment of the present invention, an electronic device corresponding to each of the first phone number and the second phone number may be an electronic device registered in the same user account.

According to an embodiment of the present invention, when making a call with the second phone number that is different from the first phone number, a screen when attempting to make a call with the first phone number may be continuously displayed on the screen of the electronic device.

According to an embodiment of the present invention, when activity concerning a main electronic device and an auxiliary electronic device increases due to the activation of a wearable device and thus there are overlapping resources between devices, by using the resources properly, efficient resource management and seamless services between devices may be provided.

According to an embodiment of the present invention, by performing a function of a component operating redundantly, a component in an electronic device having less remaining battery power, or a component in an electronic device having lower performance than a component in another electronic device, it is possible to increase the efficiency of function performance, power management, and resource management.

Additionally, according to an embodiment of the present invention, when the activity of a main electronic device and an auxiliary electronic device increase due to the activation of a wearable device and thus there are overlapping resources between devices, by using the resources properly, efficient resource management and seamless services between devices may be provided.

The above embodiments of the present invention are illustrative and not limitative. Various alternatives and equivalents are possible. The invention is not limited by the steps describe herein. Nor is the invention limited to any specific type of semiconductor device. For example, the present invention may be implemented in a Dynamic Random Access Memory (DRAM) device or non-volatile memory device. Other additions, subtractions, or modifications are obvious in view of the present disclosure and are intended to fall within the scope of the present invention, as defined by the appended claims and their equivalents.

What is claimed is:

1. A portable communication device comprising:
    first communication circuitry to establish a short-range communication connection;
    second communication circuitry to establish a cellular communication connection; and
    a processor configured to:
        establish, using the first communication circuitry, a short-range communication connection with a first external device;
        determine, based on information received using the first communication circuitry, if the first external device supports a cellular communication connection for the portable communication device;
        deactivate a telephone call function via a cellular communication connection using the second communication circuitry, based at least in part on a determination that the portable communication device is communicatively coupled with the first external device via the short-range communication connection and the first external device supports a cellular communication connection for the portable communication device via cellular communication circuitry of the first external device; and
        while the telephone call function via the cellular communication connection is deactivated, perform, based on a user input, a telephone call with respect to a second external device via the short-range communication connection between the portable communication device and the first external device, and via another cellular communication connection between the first external device and the second external device.

2. The portable communication device of claim 1, wherein the processor is further configured to:
    activate the telephone call function based at least in part on a determination that the portable communication device is not communicatively coupled with the first external device via the short-range communication connection; and
    while the telephone call function is activated, perform another telephone call with respect to a third external device using a cellular communication connection between the portable communication device and the third external device, wherein the cellular communication connection between the portable communication device and the third external device is established using the second communication circuitry.

3. The portable communication device of claim 1, further comprising a microphone, and wherein the processor is further configured to:
    as at least part of performing the telephone call, transmit a signal to the first external device via the short-range communication connection such that a call session corresponding to the telephone call is to be established between the first external device and the second external device, and transmit, to the first external device via the short-range communication connection, voice data corresponding to a voice input being received with respect to the telephone call via the microphone.

4. The portable communication device of claim 1, further comprising a camera, and wherein the processor is further configured to:
    as at least part of performing the telephone call, transmit to the first external device via the short-range communication connection, video data being obtained with respect to the telephone call via the camera.

5. The portable communication device of claim 1, wherein the processor is further configured to perform the telephone call using a phone number of the first external device.

6. The portable communication device of claim 1, wherein the processor is further configured to:

activate the telephone call function based at least in part on a determination that the first external device does not support a cellular communication connection for the portable communication device via the cellular communication circuitry of the first external device; and while the telephone call function is activated, perform another telephone call with respect to a fourth external device using a cellular communication connection between the portable communication device and the fourth external device, wherein the cellular communication connection between the portable communication device and the fourth external device is established using the second communication circuitry.

7. The portable communication device of claim 1, wherein the processor is further configured to:
receive information related to a power state of the first external device from the first external device via the short-range communication connection; and
activate the telephone call function based at least in part on a determination that the power state of the first external device corresponds to a specified condition.

8. The portable communication device of claim 1, wherein the processor is further configured to:
identify a state of the short-range communication connection; and
activate the telephone call function, based at least in part on a determination that the state of the short-range communication connection corresponds to a specified condition.

9. The portable communication device of claim 8, wherein the processor is further configured to:
identify that the state of the short-range communication connection based at least in part on an intensity of another signal received from the first external device.

10. The portable communication device of claim 1, wherein, based at least in part on user account information of the portable communication device and the determination, the processor is further configured to:
perform, based on a user input received at the portable communication device, a telephone call with respect to the second external device using the short-range communication connection and the other cellular communication connection between the first external device and the second external device, wherein the other cellular communication connection is established via the cellular communication circuitry of the first external device.

11. A system for portable communication comprising:
a portable device comprising:
first communication circuitry to perform short-range communication;
second communication circuitry to perform cellular communication; and
a processor configured to establish, via the first communication circuitry, a short-range communication connection with a wearable device; and
the wearable device comprising:
third communication circuitry to perform short-range communication;
fourth communication circuitry to perform cellular communication; and
a processor configured to:
establish, via the third communication circuitry, the short-range communication connection with the portable device;
obtain information indicating whether the portable device supports cellular communication for the wearable device via the second communication circuitry;
based at least in part on the obtained information and a determination that the wearable device is communicatively coupled with the portable device via the short-range communication connection, perform, based on a user input, a telephone call with respect a first external device using the short-range communication connection and a cellular communication connection between the portable device and the first external device, wherein the cellular communication connection is established via the second communication circuitry of the portable device.

12. The system of claim 11, wherein the processor of the portable device is further configured to display an object based on a determination that the telephone call is performed by the portable device.

13. The system of claim 11, wherein:
the portable device further comprises a first memory configured to store first identification information;
the wearable device further comprises a second memory configured to store second identification information; and
the processor of the wearable device is further configured to transmit the second identification information to the portable device when performing the telephone call.

14. The system of claim 11, wherein the processor of the wearable device is further configured to display an icon indicating the portable device provides a telephone call function for the wearable device when the information indicates that the portable device supports the cellular communication for the wearable device via the second communication circuitry and the wearable device is communicatively coupled with the portable device via the short-range communication connection.

15. The system of claim 11, wherein the processor of the wearable device is further configured to:
based at least in part on a determination that the short-range communication connection between the wearable device and the portable device is disconnected; and
perform a telephone call with respect to a second external device using a cellular communication connection between the wearable device and the second external device, wherein the cellular communication connection between the wearable device and the second external device is established via the fourth communication circuitry of the wearable device.

16. A portable communication device comprising:
first communication circuitry to perform a short-range communication;
second communication circuitry to perform a cellular communication; and
a processor configured to:
establish, via the first communication circuitry, a short-range communication connection with a first external device;
based on a first determination that the portable communication device is communicatively coupled with the first external device via the short-range communication connection and the first external device supports a cellular communication for the portable communication device via cellular communication circuitry of the first external device, perform, based on a user input, a telephone call with respect to a second external device using the short-range communication connection and a first cellular communication connection between the first external device and the second external device, wherein the first cellular communication connection is established via the cellular communication circuitry of the first external device; and based on a second determination that the portable communication device is not communicatively coupled with the first external device via the short-range communication connection, perform, based on a user input, a telephone call with respect to the second external device using a second cellular communication connection between the portable communication device and the second external device, wherein the second cellular communication connection is established via the second communication circuitry of the portable communication device.

17. The portable communication device of claim 16, wherein the processor is further configured to:
based on the first determination, deactivate a telephone call function using the second communication circuitry.

18. The portable communication device of claim 16, wherein the processor is further configured to:
establish, via the first communication circuitry, the short-range communication connection with the first external device when identification information of the portable communication device is associated with identification information of the first external device.

19. The portable communication device of claim 16, wherein the processor is further configured to:
based on the second determination, activate a telephone call function using the second communication circuitry.

20. The portable communication device of claim 16, wherein the processor is further configured to:
perform the telephone call with respect to the second external device using the second cellular communication connection, further based on a third determination that the first external device does not support a cellular communication for the portable communication device via the cellular communication circuitry of the first external device.

21. A system for portable communication comprising:
a portable device comprising:
first communication circuitry to perform short-range communication;
second communication circuitry to perform cellular communication; and
a processor configured to establish, via the first communication circuitry, a short-range communication connection with a wearable device; and
the wearable device comprising:
third communication circuitry to perform short-range communication;
fourth communication circuitry to perform cellular communication; and
a processor configured to establish, via the third communication circuitry, the short-range communication connection with the portable device;
wherein, based at least in part on user account information of the wearable device and a determination that the wearable device is communicatively coupled with the portable device via the short-range communication connection, the system is configured to perform, based on a user input received at the wearable device, a telephone call with respect to an external device using the short-range communication connection and a first cellular communication connection between the portable device and the external device, wherein the first cellular communication connection is established via the second communication circuitry of the portable device.

22. The portable communication device of claim 1, wherein the processor is further configured to:
based on the information, received using the first communication circuitry, indicating the first external device supports the cellular communication connection for the portable communication device via the cellular communication circuitry of the first external device, display an icon indicating the first external device supports the cellular communication connection for the portable communication device.

* * * * *